US009553532B2

(12) United States Patent
Ito et al.

(10) Patent No.: US 9,553,532 B2
(45) Date of Patent: Jan. 24, 2017

(54) CONTROL DEVICE FOR ALTERNATING CURRENT ROTARY MACHINE

(71) Applicants: Masato Ito, Chiyoda-ku (JP); Yosuke Hachiya, Chiyoda-ku (JP); Satoru Terashima, Chiyoda-ku (JP)

(72) Inventors: Masato Ito, Chiyoda-ku (JP); Yosuke Hachiya, Chiyoda-ku (JP); Satoru Terashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/368,082

(22) PCT Filed: Sep. 26, 2012

(86) PCT No.: PCT/JP2012/074639
§ 371 (c)(1),
(2) Date: Jun. 23, 2014

(87) PCT Pub. No.: WO2013/111383
PCT Pub. Date: Aug. 1, 2013

(65) Prior Publication Data
US 2014/0368135 A1    Dec. 18, 2014

(30) Foreign Application Priority Data

Jan. 24, 2012   (JP) .................... 2012-011645

(51) Int. Cl.
*H02P 21/00* (2006.01)
*H02P 6/18* (2016.01)
*H02P 21/14* (2016.01)

(52) U.S. Cl.
CPC ............ *H02P 6/181* (2013.01); *H02P 6/182* (2013.01); *H02P 6/183* (2013.01); *H02P 21/141* (2013.01); *H02P 21/18* (2016.02); *H02P 21/24* (2016.02)

(58) Field of Classification Search
USPC ............................ 318/400.02, 35, 115, 161
See application file for complete search history.

(56) References Cited

U.S. PATENT DOCUMENTS 8,525,454 B2 * 9/2013 Kimpara .............. H02P 29/022
                                                                 318/400.02
8,610,388 B2 * 12/2013 Ito ......................... H02P 6/185
                                                                 318/400.14

(Continued)

FOREIGN PATENT DOCUMENTS

EP     1 303 035 A1    4/2003
EP     1 492 224 A1   12/2004

(Continued)

OTHER PUBLICATIONS

International Search Report issued Dec. 25, 2012, in PCT/JP12/074639 filed Sep. 26, 2012.

(Continued)

*Primary Examiner* — Eduardo Colon Santana
*Assistant Examiner* — Iftekhar Mustafa
(74) *Attorney, Agent, or Firm* — Oblon, McClelland, Maier & Neustadt, L.L.P.

(57) ABSTRACT

A control device for AC rotary machine includes a current vector detection section (3), a magnetic flux vector detection section (9), an adaptive observation section (8), a control section (4), a voltage application section (5), a deviation vector calculation section (6) for outputting a current deviation vector and a magnetic flux deviation vector, and a deviation amplification section (7). The adaptive observation section (8) calculates an estimated current vector, an estimated magnetic flux vector, and an estimated position, based on a voltage instruction vector and an amplified deviation vector. Further, the control section (4) superimposes a high-frequency voltage vector, and the magnetic flux vector detection section (9) calculates a detected magnetic (Continued)

flux vector, based on a magnitude of a high-frequency current vector having the same frequency component as the high-frequency voltage vector, included in a detected current vector, and on a magnitude of a rotor magnetic flux.

13 Claims, 25 Drawing Sheets

(56) References Cited

U.S. PATENT DOCUMENTS

| | | | | |
|---|---|---|---|---|
| 8,917,050 | B2* | 12/2014 | Kimpara | B62D 5/0424 |
| | | | | 318/400.26 |
| 8,971,067 | B2* | 3/2015 | Kim | H02M 7/5387 |
| | | | | 363/41 |
| 2003/0102839 | A1 | 6/2003 | Kinpara et al. | |
| 2005/0024009 | A1 | 2/2005 | Kinpara et al. | |
| 2010/0194319 | A1 | 8/2010 | Ito et al. | |
| 2012/0001573 | A1* | 1/2012 | Kimpara | H02P 29/032 |
| | | | | 318/400.02 |

FOREIGN PATENT DOCUMENTS

| | | |
|---|---|---|
| EP | 2 413 494 A1 | 2/2012 |
| JP | 10-94298 | 4/1998 |
| JP | 2006-158046 | 6/2006 |
| JP | 4672236 | 4/2011 |
| WO | WO 2009/040965 A1 | 4/2009 |
| WO | 2010/109528 A1 | 9/2010 |

OTHER PUBLICATIONS

Office Action mailed Nov. 19, 2015 in Korean Patent Application No. 2014-7020803 (with English Translation).
Extended European Search Report issued May 27, 2016 in Patent Application No. 12866834.0.
Joachim Holtz, "Sensorless Control of Induction Motor Drives", Proceedings of the IEEE, vol. 90, No. 8, XP011065049, Aug. 1, 2002, 36 pages.
Office Action issued Jan. 28, 2016 in Chinese Patent Application No. 201280068016.5 (with English language translation).
Office Action issued Sep. 8, 2016, in Chinese Patent Application No. 201280068016.5 (with partial English-language translation).

* cited by examiner

025# CONTROL DEVICE FOR ALTERNATING CURRENT ROTARY MACHINE

TECHNICAL FIELD

The present invention relates to a control device for AC rotary machine, capable of controlling an AC rotary machine such as an induction machine or a synchronous machine without using a position sensor for obtaining rotor position information.

BACKGROUND ART

A sensorless control method performed based on induced voltage with use of an adaptive observer or the like is known as a method for controlling an AC rotary machine such as a synchronous machine or an induction machine. The sensorless control method based on induced voltage has a feature that a position sensor or a velocity sensor can be omitted. However, in a low-speed rotation region, induced voltage is small and therefore it is difficult to detect or estimate induced voltage. Thus, there is a problem that the drive characteristics deteriorate in a low-speed rotation region.

On the other hand, in a low-speed region, by performing control based on a result of position detection using saliency of inductance while superimposing voltage or current having a frequency different from a fundamental frequency of an AC rotary machine, it becomes possible to perform driving in a low-speed region even by a position sensorless control. However, in the case of performing driving in a high rotation region by using saliency of inductance, there is disadvantage in operation efficiency, voltage usage rate, and maximum current because of occurrence of voltage or current other than a fundamental wave.

Considering the above, if an AC rotary machine is driven based on a result of position detection using saliency of inductance and the AC rotary machine is driven by sensorless control using induced voltage in a high rotation region, it becomes possible to provide a device that can be driven in the entire speed region with low cost. In this case, it is important to perform smooth driving over a range from a low-speed region to a high-speed region.

For making it possible to smoothly drive an AC rotary machine over a range from a low-speed region to a high-speed region, the following invention is disclosed, for example.

In order to appropriately generate a phase in a rotational dq coordinate system required in a vector controller basic section without using a position sensor, a low-frequency region phase generator for generating a phase for low-frequency region and a high-frequency region phase generator for generating a phase for high-frequency region are provided, and further, a phase synthesizer for synthesizing these two kinds of phases by averaging them in a weighted manner in terms of frequency is provided, whereby the synthesized final phase is used as a phase in a rotational dq coordinate system (for example, see Patent Document 1).

In addition, the following invention is disclosed. In a sensorless control method for performing continuous control over a range from zero speed to a high-speed region of an AC electric motor, control is performed by using a velocity estimated value west and a position estimated value θ0 estimated by a mechanical mathematical expression model by a position and velocity estimation device, so that position error Δθ obtained by calculation of a cross product of a first magnetic flux vector calculated by using a rotor angle and a second magnetic flux vector calculated without using a rotor angle becomes zero (for example, see Patent Document 2).

CITATION LIST

Patent Document

Patent Document 1: Japanese Laid-Open Patent Publication No. 10-94298 (paragraph [0032], FIG. 1)
Patent Document 2: Japanese Laid-Open Patent Publication No. 2006-158046 (paragraphs [0012] and [0013], FIGS. 2 and 3)

SUMMARY OF THE INVENTION

Problems to be Solved by the Invention

In the invention disclosed in Patent Document 1, since two kinds of phases are synthesized by being averaged in a weighted manner in terms of frequency, it is necessary to obtain a phase for low-speed region and a phase for high-speed region simultaneously, and therefore computing processing is performed in both the low-frequency region phase generator and the high-frequency region phase generator simultaneously, resulting in a problem of greatly increasing the amount of computing processing. In addition, in a low-speed region in which a frequency is low, it is necessary to perform driving based on, of the two kinds of phases, the phase of the low-frequency region phase generator, and therefore there is also a problem that, if estimation response of the low-frequency region phase generator is delayed, response performance such as velocity control response or torque control response cannot be maintained at a high level in a low-speed region.

In addition, in the invention disclosed in Patent Document 2, a rotor angle is needed for obtaining the first magnetic flux vector, and it is necessary to obtain the rotor angle in advance by detection or computing processing, resulting in a problem of increasing the computing amount. In addition, if response of detection or estimation of a rotor angle needed for obtaining the first magnetic flux vector is delayed, response of position error Δθ obtained by calculation of cross product of the first magnetic flux vector and the second magnetic flux vector is also delayed, and response of the velocity estimated value west and the position estimated value best calculated by the position and velocity estimation device is also delayed. As a result, a problem arises that response performance such as velocity control response or torque control response cannot be maintained at a high level.

The present invention has been made to solve the above problems, and an object of the present invention is to provide a control device for AC rotary machine that can smoothly drive an AC rotary machine without using a position sensor over the entire speed region and can realize reduction in the computing amount and improvement in response performance.

Solution to the Problems

A control device for AC rotary machine according to the present invention includes: a current vector detection section for detecting a detected current vector from current of an AC rotary machine; a magnetic flux vector detection section for detecting a rotor magnetic flux vector from the detected current vector of the AC rotary machine and outputting the rotor magnetic flux vector as a detected magnetic flux vector; an adaptive observation section for outputting an estimated current vector, an estimated magnetic flux vector, and an estimated position of the AC rotary machine; a control section for outputting a voltage instruction vector so that the detected current vector coincides with a current instruction vector; a voltage application section for applying voltage to the AC rotary machine, based on the voltage instruction vector; a deviation vector calculation section for outputting a current deviation vector which is a deviation between the estimated current vector and the detected current vector, and a magnetic flux deviation vector which is a deviation between the estimated magnetic flux vector and the detected magnetic flux vector; and a deviation amplification section for amplifying the current deviation vector and the magnetic flux deviation vector and outputting the amplified vectors as an amplified deviation vector. The adaptive observation section calculates and outputs the estimated current vector, the estimated magnetic flux vector, and the estimated position, based on the voltage instruction vector and the amplified deviation vector. Further, the control section outputs a voltage instruction vector on which a high-frequency voltage vector having a frequency component different from a frequency for driving the AC rotary machine is superimposed, and the magnetic flux vector detection section calculates and outputs the detected magnetic flux vector, based on a magnitude of a high-frequency current vector having the same frequency component as the high-frequency voltage vector, included in the detected current vector, and on a magnitude of a rotor magnetic flux.

Effect of the Invention

Owing to the above-described configuration, the control device for AC rotary machine according to the present invention makes it possible to provide a control device for AC rotary machine that can smoothly drive an AC rotary machine without using a position sensor over the entire speed region and can realize reduction in the computing amount and improvement in response performance.

DESCRIPTION OF EMBODIMENTS

Embodiment 1

Embodiment 1 relates to a control device for AC rotary machine that calculates a magnetic flux deviation vector which is a deviation between a detected magnetic flux vector and an estimated magnetic flux vector, and a current deviation vector which is a deviation between a detected current vector and an estimated current vector, and drives an AC rotary machine by using an estimated velocity and an estimated position outputted from an adaptive observation section based on an amplified deviation vector obtained by amplification of the calculated deviation vectors. Here, in calculation of a detected magnetic flux vector outputted from a magnetic flux vector detection section, a high-frequency current vector having the same frequency component as a high-frequency voltage vector is extracted from a detected current vector, and then, by using the magnitude of a component orthogonal to the high-frequency voltage vector, a difference $\Delta\theta$ between d axis on which the high-frequency voltage vector is applied and dm axis which is parallel to a rotor magnetic flux vector is calculated, and only $\Delta\theta$ and a magnitude $\phi f$ the rotor magnetic flux vector are used.

Figure 1:
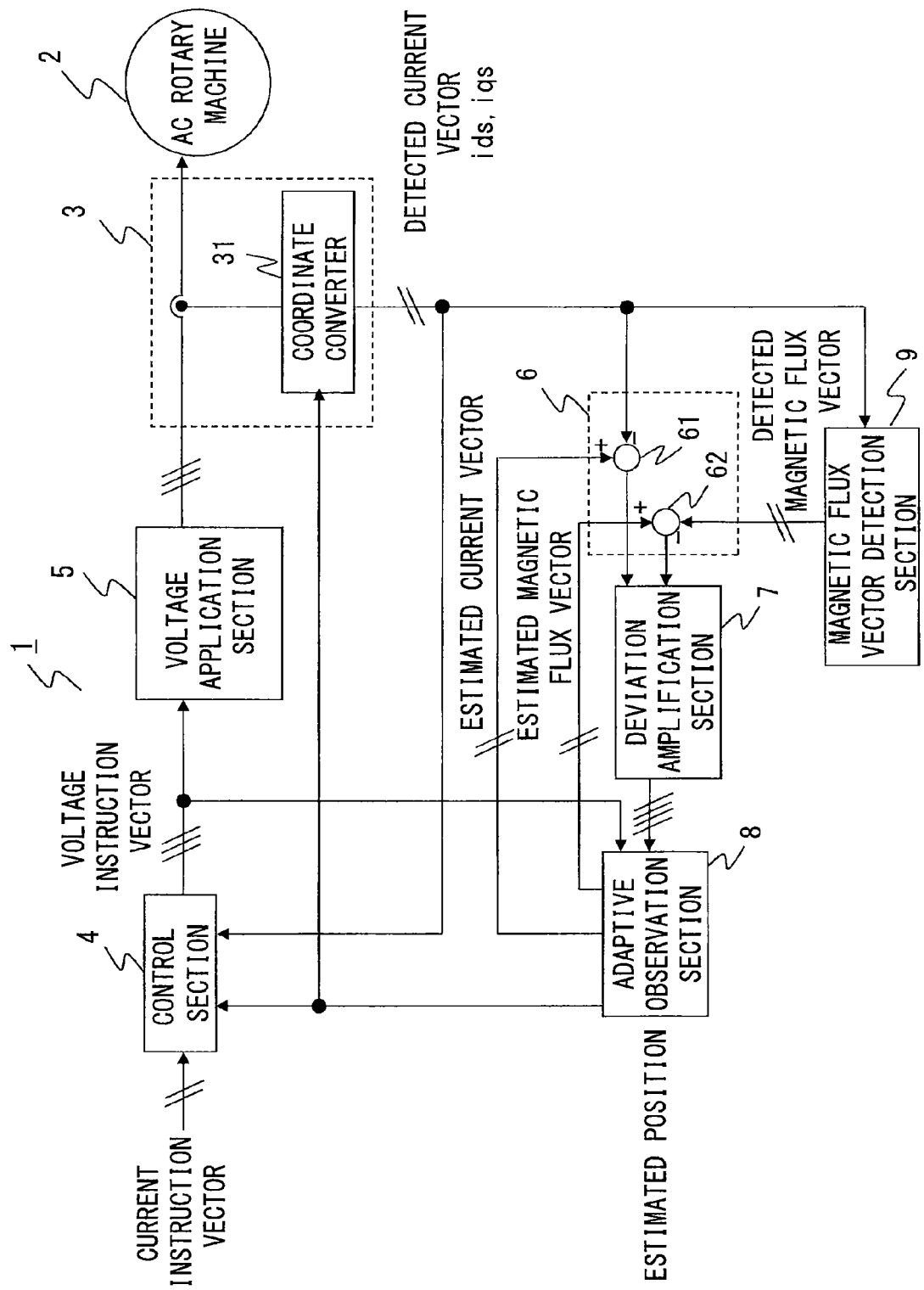
FIG. 1 is a system configuration diagram according to a control device for AC rotary machine of embodiment 1 of the present invention.
Figure 2:
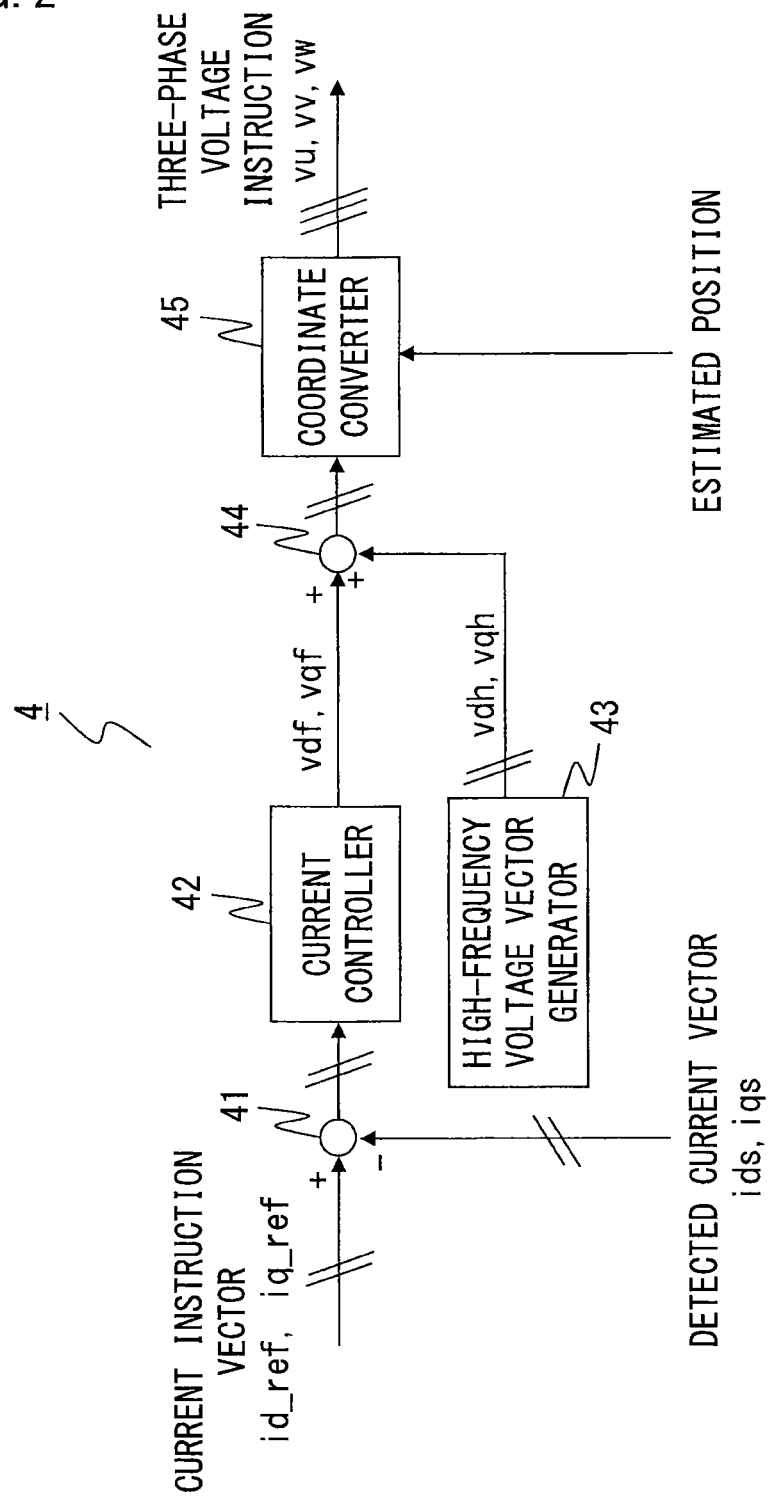
FIG. 2 is a configuration diagram of a control section according to the control device for AC rotary machine of embodiment 1 of the present invention.
Figure 3:
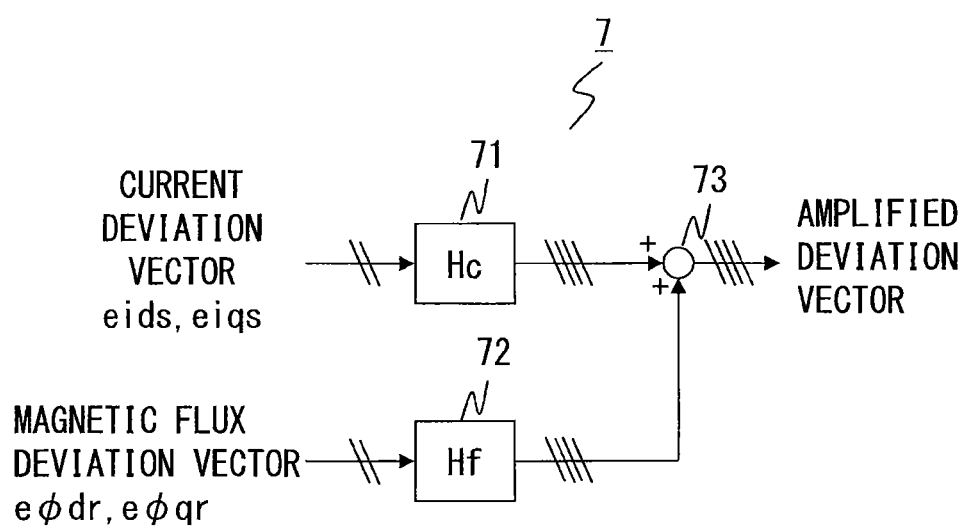
FIG. 3 is a configuration diagram of a deviation amplification section according to the control device for AC rotary machine of embodiment 1 of the present invention.
Figure 4:
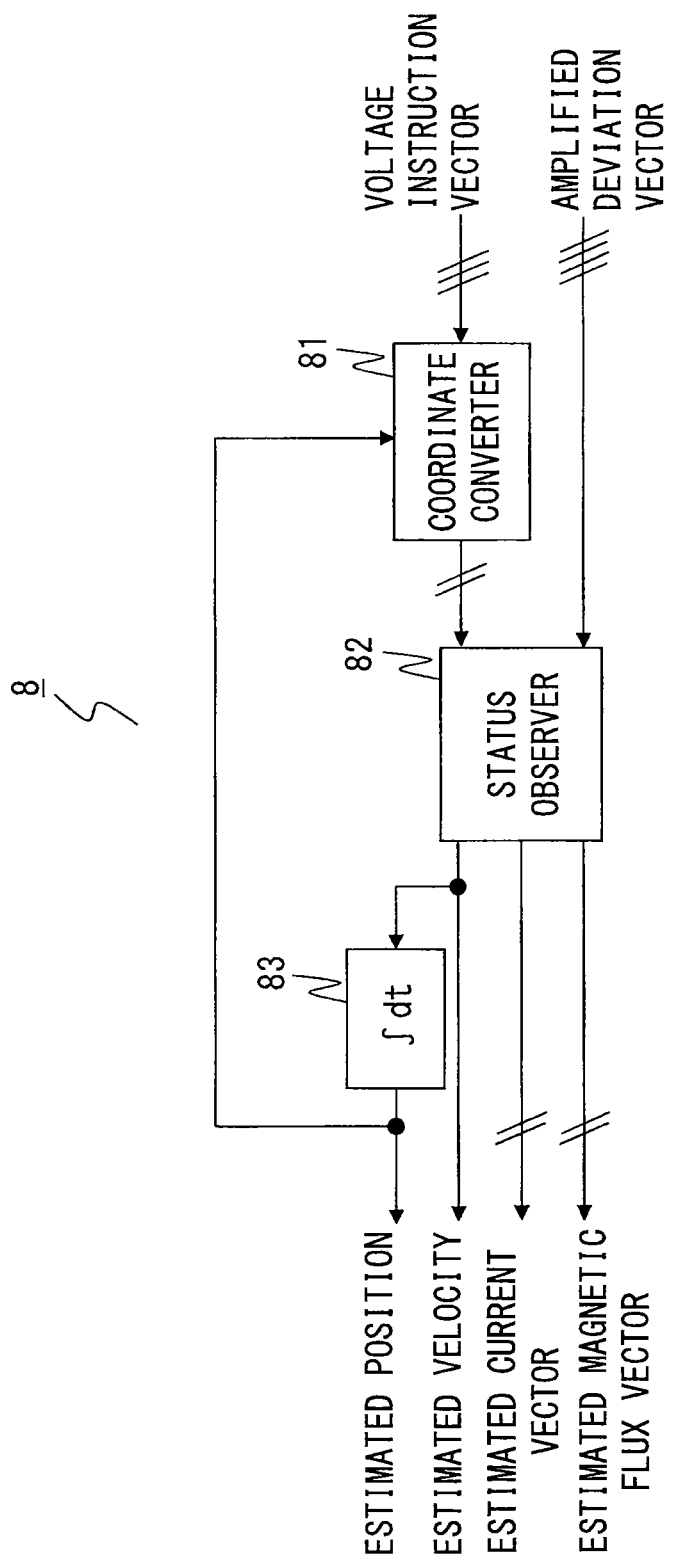
FIG. 4 is a configuration diagram of an adaptive observation section according to the control device for AC rotary machine of embodiment 1 of the present invention.
Figure 5:
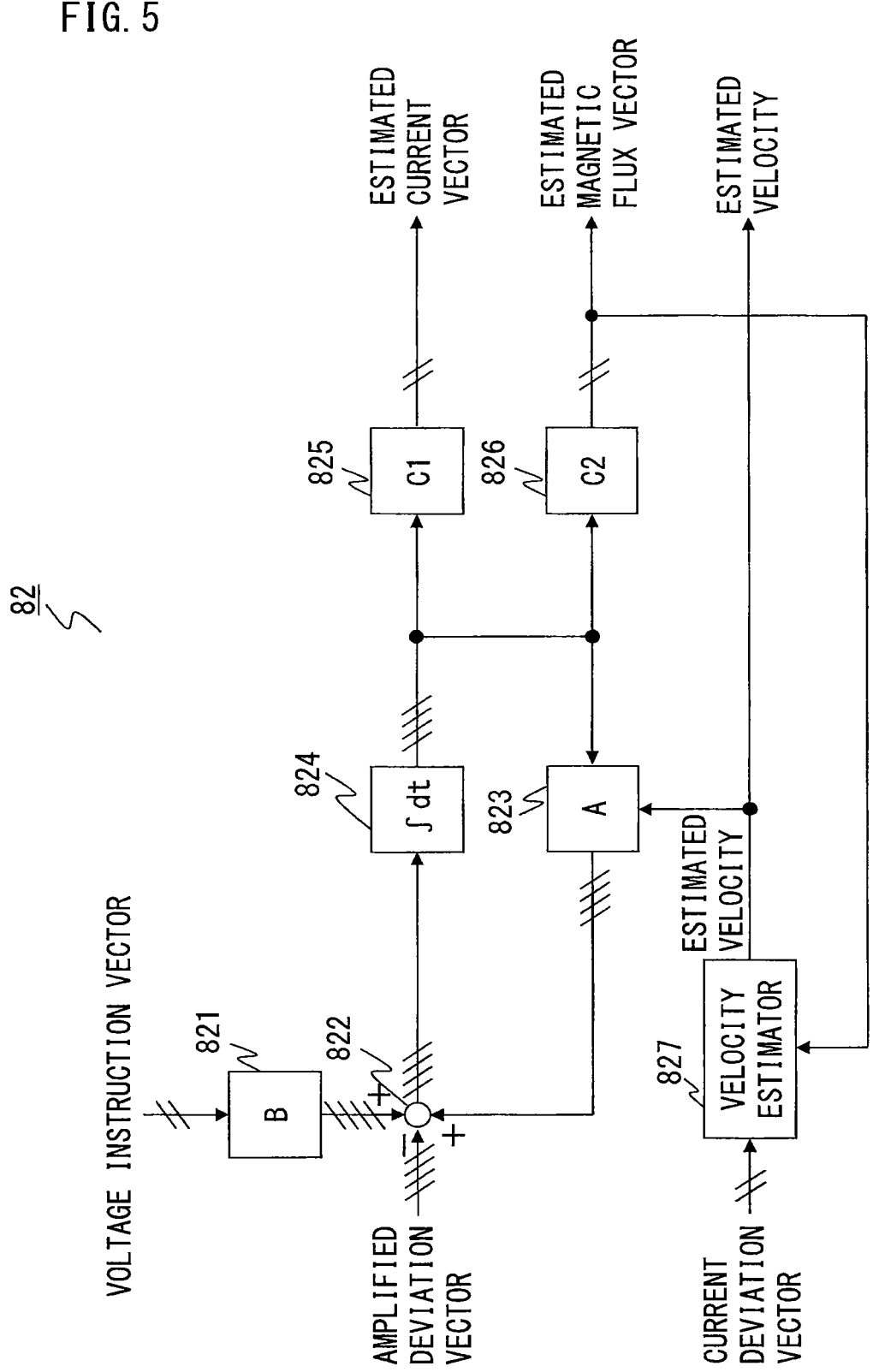
FIG. 5 is an internal configuration diagram of the adaptive observation section according to the control device for AC rotary machine of embodiment 1 of the present invention.
Figure 6:
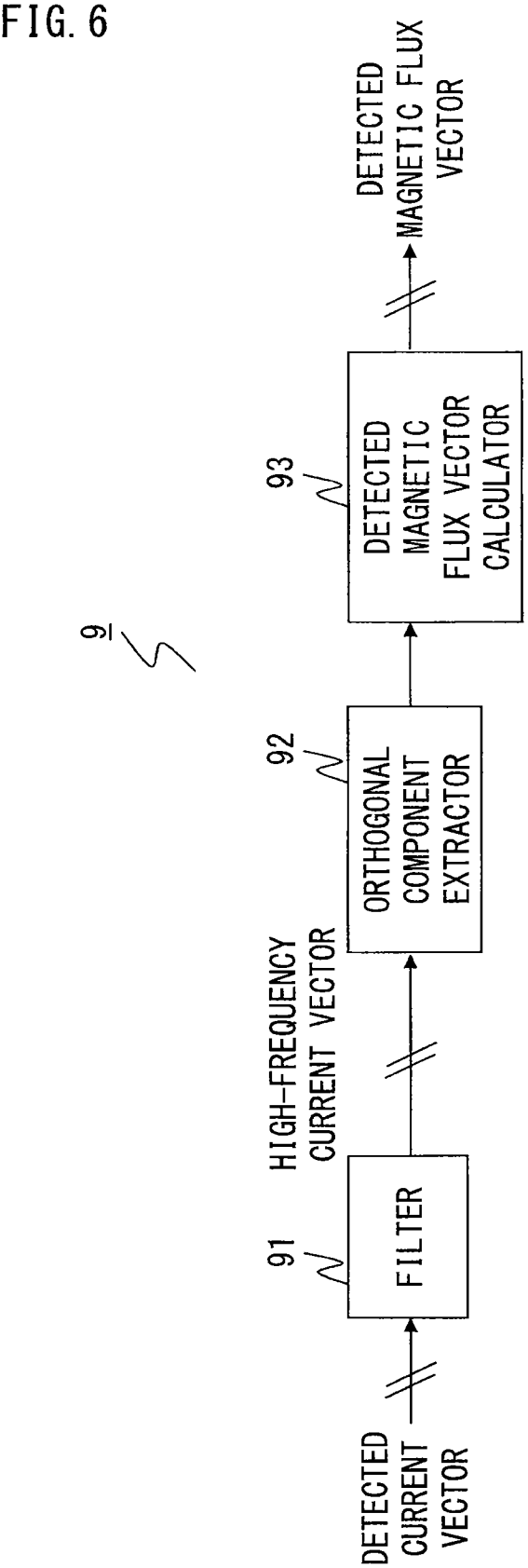
FIG. 6 is a configuration diagram of a magnetic flux vector detection section according to the control device for AC rotary machine of embodiment 1 of the present invention.
Figure 7:
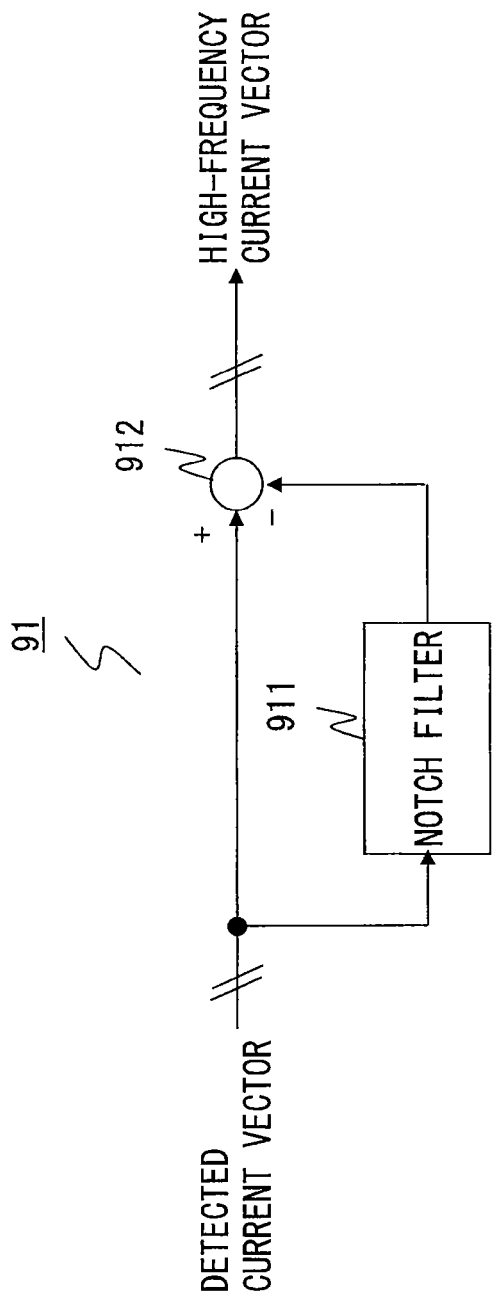
FIG. 7 is an internal configuration diagram of the magnetic flux vector detection section according to the control device for AC rotary machine of embodiment 1 of the present invention.
Figure 8:
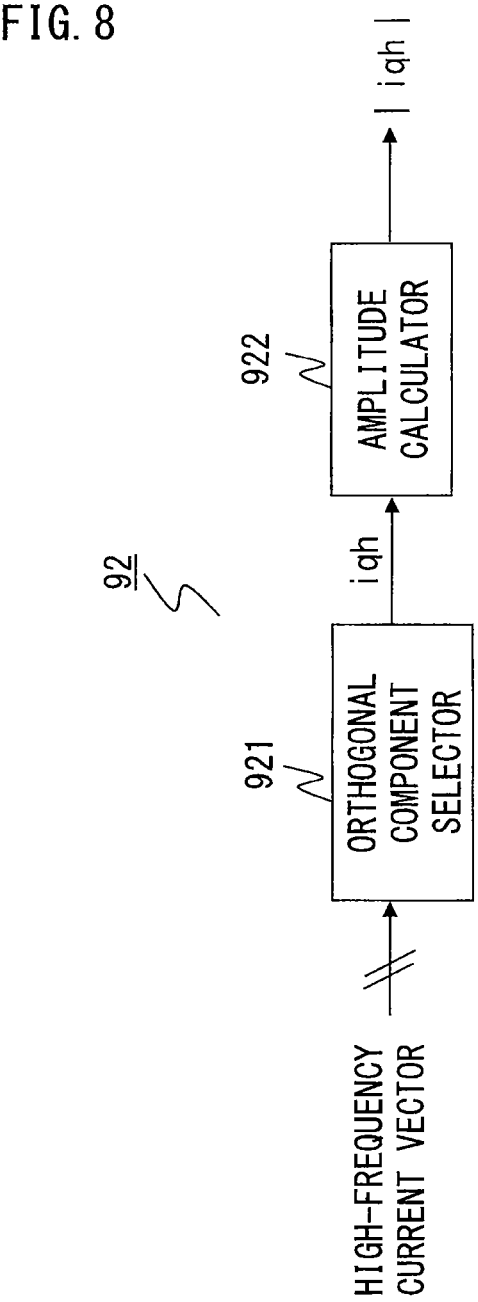
FIG. 8 is an internal configuration diagram of the magnetic flux vector detection section according to the control device for AC rotary machine of embodiment 1 of the present invention.
Figure 9:
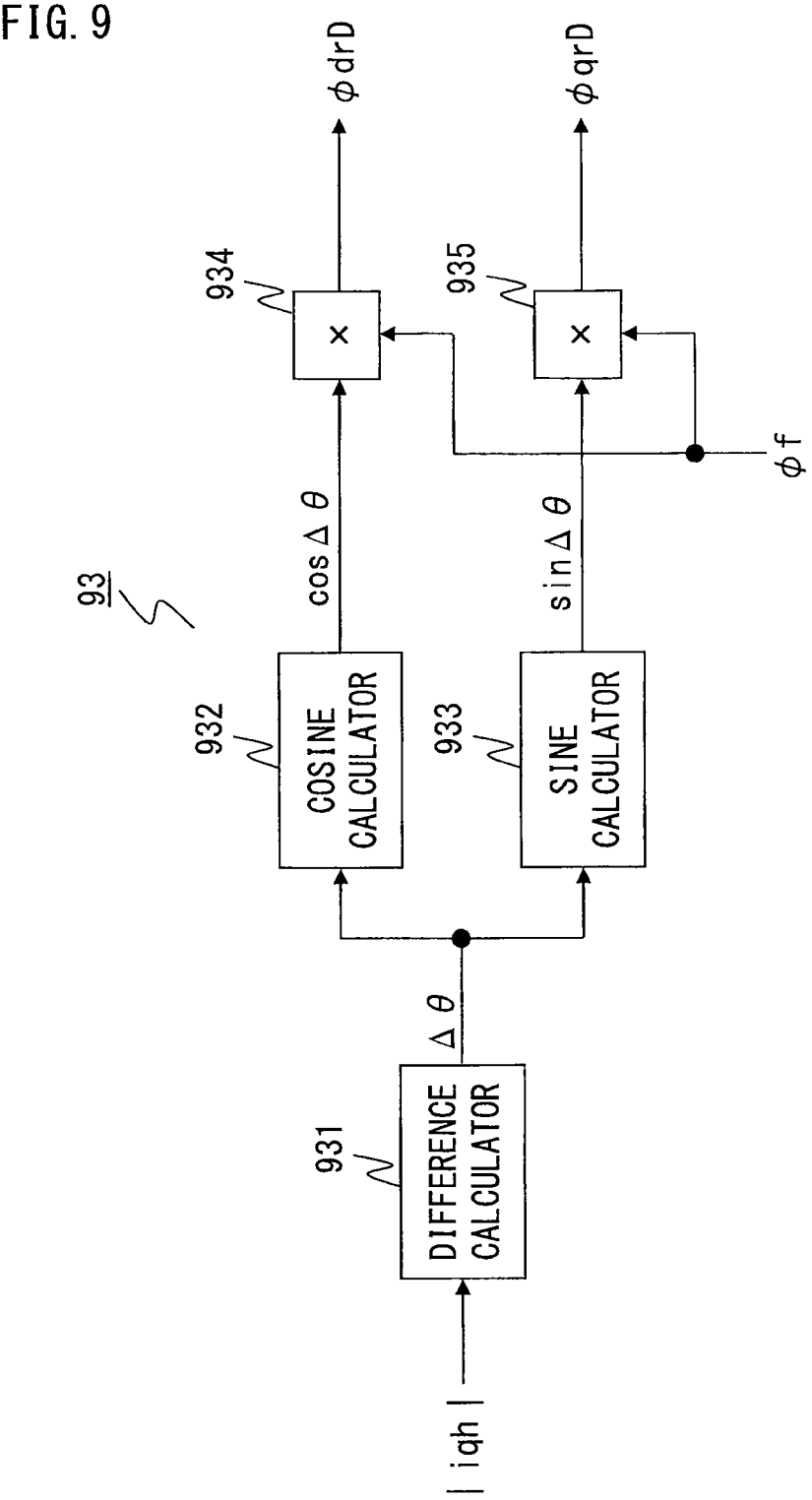
FIG. 9 is an internal configuration diagram of the magnetic flux vector detection section according to the control device for AC rotary machine of embodiment 1 of the present invention.
Figure 10:
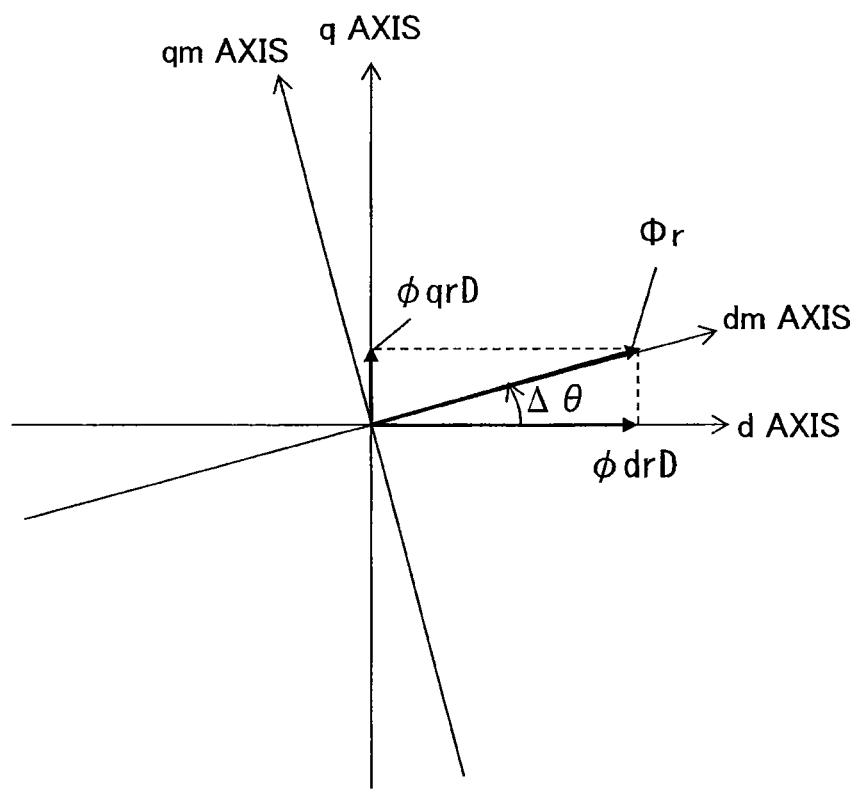
FIG. 10 is an explanation diagram of a rotor magnetic flux vector according to the control device for AC rotary machine of embodiment 1 of the present invention.
Figure 11:
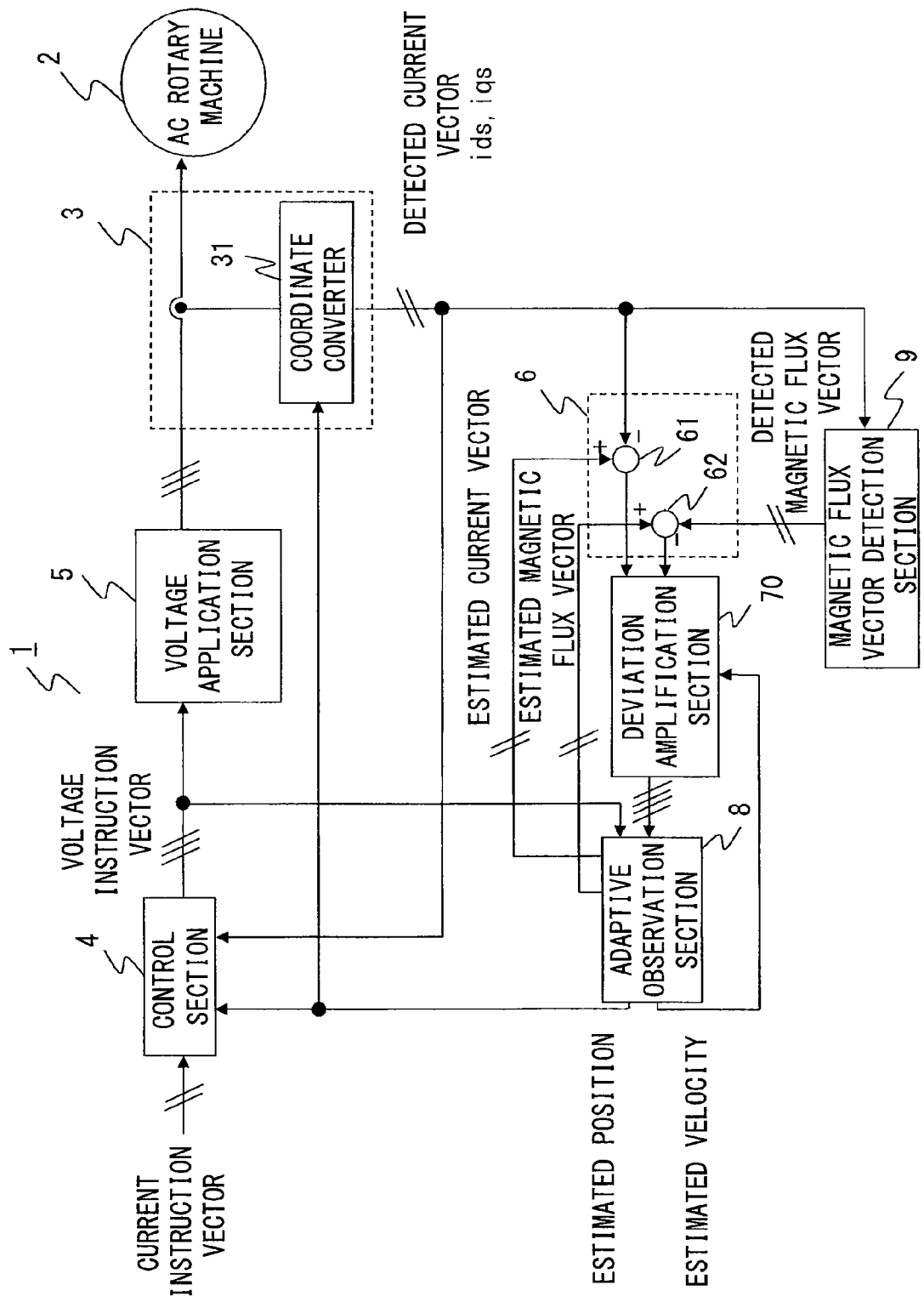
FIG. 11 is a system configuration diagram of a modification according to the control device for AC rotary machine of embodiment 1 of the present invention.
Figure 12:
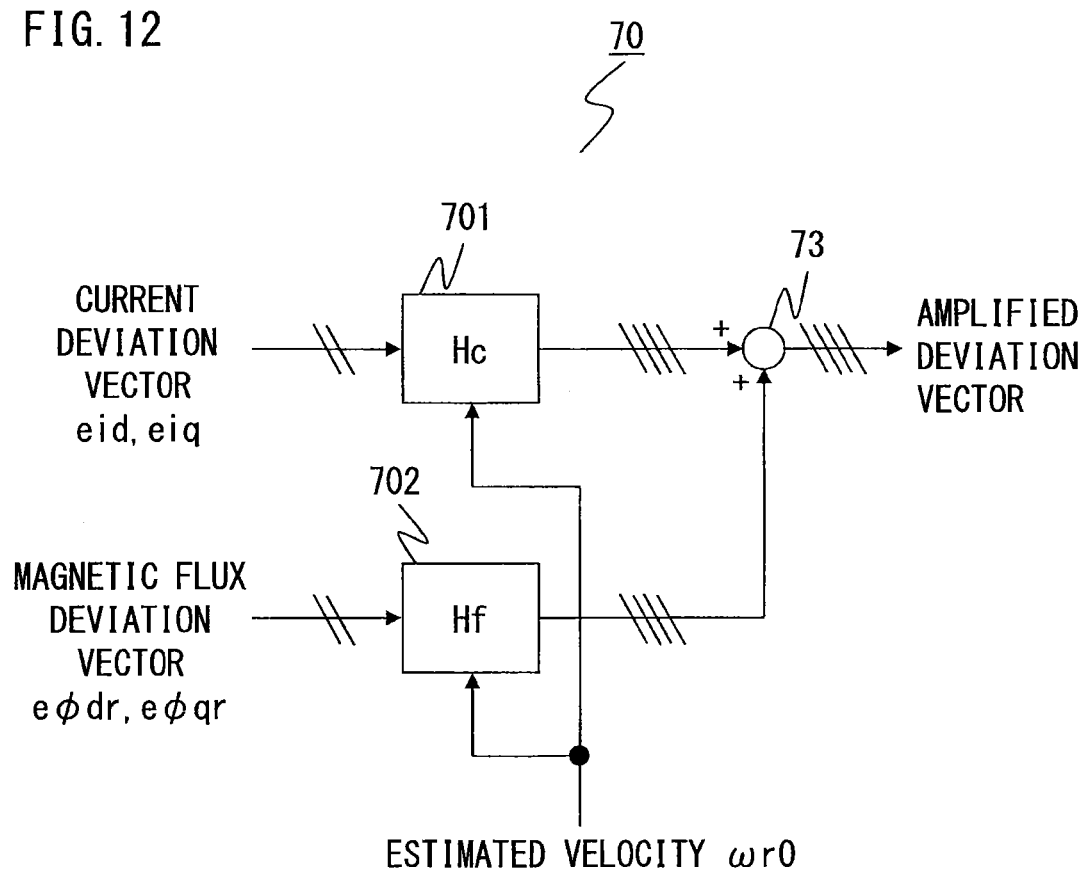
FIG. 12 is a configuration diagram of a deviation amplification section of the modification according to the control device for AC rotary machine of embodiment 1 of the present invention.

Hereinafter, embodiment 1 of the present invention will be described based on FIG. 1 showing a system configuration diagram according to a control device 1 for AC rotary machine, FIG. 2 showing a configuration diagram of a control section, FIG. 3 showing a configuration diagram of a deviation amplification section, FIG. 4 showing a configuration diagram of an adaptive observation section, FIG. 5 showing an internal configuration diagram of the adaptive observation section, FIG. 6 showing a configuration diagram of a magnetic flux vector detection section, FIGS. 7 to 9 showing internal configuration diagrams of the magnetic flux vector detection section, FIG. 10 showing an explanation diagram of a rotor magnetic flux vector, FIG. 11 showing a system configuration diagram of a modification, and FIG. 12 showing a configuration diagram of a deviation amplification section of the modification.

First, the entire system configuration including the control device 1 for AC rotary machine according to embodiment 1 of the present invention will be described.

In FIG. 1, the control device 1 for AC rotary machine is composed of a current vector detection section 3, a control section 4, a voltage application section 5, a deviation vector calculation section 6, a deviation amplification section 7, an adaptive observation section B, and a magnetic flux vector detection section 9, in order to control an AC rotary machine 2.

It is noted that in FIG. 1, two diagonal lines (//), three diagonal lines (///), and four diagonal lines (////) indicate 2-dimensional, 3-dimensional, and 4-dimensional vectors, respectively.

The details of the configuration, function, and operation of the control device 1 for AC rotary machine will be described later. First, the summary of the function of each constituent part of the control device 1 for AC rotary machine will be described.

The current vector detection section 3 detects a detected current vector from current of the AC rotary machine 2. The magnetic flux vector detection section 9 detects a rotor magnetic flux vector from the detected current vector of the AC rotary machine 2 outputted from the current vector detection section 3, and outputs the rotor magnetic flux vector as a detected magnetic flux vector. The adaptive observation section 8 outputs an estimated current vector, an estimated magnetic flux vector, and an estimated position of the AC rotary machine 2 from the detected magnetic flux vector. The control section 4 outputs a voltage instruction vector so that the detected current vector coincides with a current instruction vector, and the voltage application section 5 applies voltage based on the voltage instruction vector, to the AC rotary machine. The deviation vector calculation section 6 outputs a current deviation vector which is a deviation between the estimated current vector and the detected current vector, and a magnetic flux deviation vector which is a deviation between the estimated magnetic flux vector and the detected magnetic flux vector. The deviation amplification section 7 amplifies the current deviation vector and the magnetic flux deviation vector and outputs them as an amplified deviation vector.

In FIG. 1, in the present embodiment 1, the case where the AC rotary machine 2 is a permanent magnet synchronous machine of saliency type having three-phase windings will be described as an example. However, even in the case of using a rotary machine of another type, the control device for AC rotary machine can be configured on the same principle.

Hereinafter, the configuration, function, and operation of each constituent part of the control device 1 for AC rotary machine will be described in order.

The current vector detection section 3 detects three-phase current flowing in the AC rotary machine 2, and outputs, as the detected current vector, d-axis current id and q-axis current iq which are respectively obtained by a coordinate converter 31 performing, by using an estimated position $\theta 0$ described later, coordinate conversion of the three-phase current into a d-axis direction and a q-axis direction of d-q axes which are known as an orthogonal coordinate system rotating in synchronization with a rotor of the AC rotary machine 2.

Next, based on FIG. 2, the configuration, function, and operation of the control section 4 will be described.

The control section 4 is composed of an adder/subtractor 41, a current controller 42, a high-frequency voltage vector generator 43, an adder/subtractor 44, and a coordinate converter 45.

In the control section 4, the adder/subtractor 41 subtracts a detected current vector (ids, iqs) from a current instruction vector (id_ref, iq_ref) given from the outside. The current controller 42 performs proportional integral control so that the deviation between the current instruction vector and the detected current vector, outputted from the adder/subtractor 41, becomes zero, and outputs a fundamental wave voltage vector (vdf, vqf). The high-frequency voltage vector generator 43 outputs a high-frequency voltage vector (vdh, vqh) on d-q axes.

It is noted that in the present embodiment 1, the high-frequency voltage vector is set as vqh=0, and thus is alternating voltage to be applied only in the d-axis direction.

The adder/subtractor 44 adds the fundamental wave voltage vector (vdf, vqf) and the high-frequency voltage vector (vdh, vqh), and thereby outputs a voltage instruction vector (vd, vq) on d-q axes. Then, by using an estimated position $\theta 0$ described later, the coordinate converter 45 converts the voltage instruction vector (vd, vq) on d-q axes outputted from the adder/subtractor 44 into a voltage instruction vector (vu, vv, vw) in a coordinate system at rest from d-q axes, and outputs the voltage instruction vector (vu, vv, vw).

The voltage application section 5 applies three-phase voltage based on the voltage instruction vector (vu, vv, vw) outputted from the control section 4, to the AC rotary machine 2.

Next, the configuration, function, and operation of the deviation vector calculation section 6 will be described.

The deviation vector calculation section 6 is composed of an adder/subtractor 61 and an adder/subtractor 62.

In the deviation vector calculation section 6, the adder/subtractor 61 subtracts a detected current vector (ids, iqs) outputted from the current vector detection section 3, from an estimated current vector (ids0, iqs0) outputted from the adaptive observation section 8 described later, and thereby outputs a current deviation vector (eids, eiqs). In addition, the adder/subtractor 62 subtracts a detected magnetic flux vector (φdrD, φqrD) outputted from the magnetic flux vector detection section described later, from an estimated magnetic flux vector (φdr0, φqr0) outputted from the adaptive observation section 8 described later, and thereby outputs a magnetic flux deviation vector (eφdr, eφqr).

Next, based on FIG. 3, the configuration, function, and operation of the deviation amplification section 7 will be described.

The deviation amplification section 7 is composed of gain matrix calculators 71 and 72 and an adder/subtractor 73.

The gain matrix calculator 71 multiplies (eids, eiqs)$^T$ (T means a transposed matrix) which is a transposed matrix of the current deviation vector (eids, eiqs), by a matrix Hc, and outputs the result. The gain matrix calculator 72 multiplies the magnetic flux deviation vector (eφdr, eφqr)$^T$ by a matrix Hf and outputs the result.

Here, the matrixes Hc and Hf are gain matrixes defined by expression (1). In expression (1), h11 to h44 are amplification gains, and the values of h11 to h44 can be freely set.

[Mathematical 1]

$$Hc = \begin{pmatrix} h11 & h12 \\ h21 & h22 \\ h31 & h32 \\ h41 & h42 \end{pmatrix}, Hf = \begin{pmatrix} h13 & h14 \\ h23 & h24 \\ h33 & h34 \\ h43 & h44 \end{pmatrix} \quad (1)$$

In FIG. 3, the adder/subtractor 73 adds the vector outputted from the gain matrix calculator 71 and the vector outputted from the gain matrix calculator 72, and thereby outputs an amplified deviation vector (e1, e2, e3, e4)$^T$.

It is noted that when the rotation speed of the AC rotary machine 2 is high, the adaptive observation section 8 described later can satisfactorily estimate the estimated velocity and the estimated position to be outputted, without using the magnetic flux deviation vector which is a deviation between the detected magnetic flux vector and the estimated magnetic flux vector. Therefore, in the case where the absolute value of an estimated velocity is great, the values of h13 to h44 are set at zero in the gain matrix calculator 72 so that output of the gain matrix calculator 72 in a high rotation region becomes zero. As a result, by stopping computing in the magnetic flux vector detection section 9, the computing amount can be reduced. In addition, by also setting at zero the high-frequency voltage vector (vdh, vqh) outputted from the high-frequency voltage vector generator 43 in the control section 4, occurrence of high-frequency current which would be caused by the high-frequency voltage vector (vdh, vqh) is prevented, whereby loss due to high-frequency current can be eliminated.

Next, the configuration, function, and operation of the adaptive observation section 8 will be described. FIG. 4 is a configuration diagram of the adaptive observation section 8, and FIG. 5 is a configuration diagram of a status observer 82 which is a main constituent element of the adaptive observation section 8.

In FIG. 4, the adaptive observation section 8 is composed of a coordinate converter 81, the status observer 82, and an integrator 83.

In FIG. 5, the status observer 82 is composed of gain matrix calculators 821, 823, 825, and 826, an adder/subtractor 822, an integrator 824, and a velocity estimator 827.

Next, the entire operation of the adaptive observation section 8 will be described.

With regard to the AC rotary machine 2, armature resistance is set at R, armature inductance in the d-axis direction is set at Ld, armature inductance in the q-axis direction is set at Lq, estimated velocity is set at ωr0, power-supply angular frequency is set at ω, and matrixes A, B, C1, and C2 are defined by expression (2).

It is noted that in the case where the AC rotary machine 2 is a non-saliency type, Ld=Lq is satisfied.

[Mathematical 2]

$$A = \begin{pmatrix} -\frac{R}{Ld} & \omega & 0 & \omega r0 \\ -\omega & -\frac{R}{Lq} & -\omega r0 & 0 \\ 0 & 0 & 0 & \omega - \omega r0 \\ 0 & 0 & -\omega + \omega r0 & 0 \end{pmatrix}, \quad (2)$$

$$B = \begin{pmatrix} 1 & 0 \\ 0 & 1 \\ 0 & 0 \\ 0 & 0 \end{pmatrix}, C1 = \begin{pmatrix} \frac{1}{Ld} & 0 & 0 & 0 \\ 0 & \frac{1}{Lq} & 0 & 0 \end{pmatrix}, C2 = \begin{pmatrix} 0 & 0 & 1 & 0 \\ 0 & 0 & 0 & 1 \end{pmatrix}$$

In addition, a d-axis component and a q-axis component of an estimated armature reaction vector on d-q axes are respectively defined as φds0 and φqs0, and a d-axis component and a q-axis component of a voltage instruction vector on d-q axes are respectively defined as vds and vqs. In this case, the estimated armature reaction vector (φds0, φqs0) and the estimated magnetic flux vector (φdr0, φqr0) can be obtained as shown by expression (3).

[Mathematical 3]

$$\frac{d}{dt}\begin{pmatrix} \phi ds0 \\ \phi qs0 \\ \phi dr0 \\ \phi qr0 \end{pmatrix} = A\begin{pmatrix} \phi ds0 \\ \phi qs0 \\ \phi dr0 \\ \phi qr0 \end{pmatrix} + B\begin{pmatrix} vds \\ vqs \end{pmatrix} - \begin{pmatrix} e1 \\ e2 \\ e3 \\ e4 \end{pmatrix} \quad (3)$$

In addition, where Laplace operator (differential operator) is defined as s, kp is defined as proportional gain, and ki is defined as integral gain, the estimated velocity ωr0 which is an internal parameter of the matrix A in expression (2) is given by expression (4), using the current deviation vector (eids, eiqs) and the estimated magnetic flux vector (φdr0, φqr0).

[Mathematical 4]

$$\omega r0 = \left(kp + \frac{ki}{s}\right)(eiqs \cdot \phi dr0 - eids \cdot \phi qr0) \quad (4)$$

The estimated position θ0 can be obtained by integrating the estimated velocity ωr0 as shown by expression (5).

[Mathematical 5]

$$\theta 0 = \frac{\omega r0}{s} \quad (5)$$

In addition, the estimated current vector (ids0, iqs0) can be calculated by expression (6).

[Mathematical 6]

$$\begin{pmatrix} ids0 \\ iqs0 \end{pmatrix} = C1 \begin{pmatrix} \phi ds0 \\ \phi qs0 \\ \phi dr0 \\ \phi qr0 \end{pmatrix} \quad (6)$$

Similarly, the estimated magnetic flux vector (φdr0, φqr0) can be calculated by expression (7).

[Mathematical 7]

$$\begin{pmatrix} \phi dr0 \\ \phi qr0 \end{pmatrix} = C2 \begin{pmatrix} \phi ds0 \\ \phi qs0 \\ \phi dr0 \\ \phi qr0 \end{pmatrix} \quad (7)$$

As described above, by using expressions (2) to (7), the estimated position θ0, the estimated current vector (ids0, iqs0), and the estimated magnetic flux vector (φdr0, φqr0) can be calculated based on the voltage instruction vector (vds, vqs), the amplified deviation vector (e1, e2, e3, e4)$^T$, and the current deviation vector (eids, eiqs).

The above is the description of the entire operation of the adaptive observation section 8.

Next, the function and operation of each main constituent element of the adaptive observation section 8 will be described.

In FIG. 4, the coordinate converter 81 converts a three-phase AC voltage instruction vector outputted from the control section 4 into the voltage instruction vector (vds, vqs) on d-q axes which are an orthogonal rotational coordinate system, and outputs the voltage instruction vector (vds, vqs) to the status observer 82. The status observer 82 calculates and outputs the estimated velocity ωr0, the estimated current vector (ids0, iqs0), and the estimated magnetic flux vector (φdr0, φqr0) based on the amplified deviation vector (e1, e2, e3, e4)$^T$ outputted from the deviation amplification section 7 and the voltage instruction vector (vds, vqs) outputted from the coordinate converter 81. The integrator 83 integrates the estimated velocity ωr0 outputted from the status observer 82 by expression (5), thereby calculating the estimated position θ0.

In FIG. 5, the gain matrix calculator 821 multiplies the voltage instruction vector (vds, vqs)$^T$ outputted from the coordinate converter 81, by the matrix B, and outputs the result. The adder/subtractor 822 outputs a vector obtained by addition and subtraction among output of the gain matrix calculator 821, output of the gain matrix calculator 823, and the amplified deviation vector (e1, e2, e3, e4)$^T$. The integrator 824 integrates each element of the vector outputted from the adder/subtractor 822, and outputs a vector (φds0, φqs0, φdr0, φqr0)$^T$. The above corresponds to the right-hand side of expression (3). It is noted that the left-hand side of expression (3) corresponds to input to the integrator 824.

The gain matrix calculator 825 multiplies the vector (φds0, φqs0, φdr0, φqr0)$^T$ by the matrix C1 and thereby outputs the estimated current vector (φds0, φqs0)$^T$. This corresponds to expression (6).

Here, the vector (φds0, φqs0, φdr0, φqr0)$^T$ is a stator/rotor estimated magnetic flux vector.

The gain matrix calculator 826 multiplies the vector (φds0, φqs0, φdr0, φqr0)$^T$ by the matrix C2 and thereby outputs the estimated magnetic flux vector (φdr0, φqr0)$^T$. This corresponds to expression (7).

The velocity estimator 827 calculates the estimated velocity ωr0 by expression (4), using the current deviation vector (eids, eiqs) and the estimated magnetic flux vector (φdr0, φqr0).

The gain matrix calculator 823 receives the estimated velocity ωr0 outputted from the velocity estimator 827, applies the matrix A to the vector (φds0, φqs0, φdr0, φqr0)$^T$ outputted from the integrator 824, and outputs the result to the adder/subtractor 822.

The above is the description of the functions and operations of the entirety and each main constituent element of the adaptive observation section 8. The feature of this adaptive observation section 8 is that the amplified deviation vector (e1, e2, e3, e4)$^T$ includes e3 and e4 obtained by amplifying the magnetic flux deviation vector (eφdr, eφqr), whereby the estimated velocity ωr0 and the estimated position θ0 can be satisfactorily calculated in a low-speed region including zero speed.

Since the detected magnetic flux vector outputted from the magnetic flux vector detection section 9 described later is not influenced by constant error or voltage error in a region of zero speed to low speed, the adaptive observation section 8 of the present embodiment can satisfactorily estimate the velocity and the position even in a region of zero speed to low speed by calculating the magnetic flux deviation vector which is a deviation between the detected magnetic flux vector and the estimated magnetic flux vector and using e3 and e4 obtained by amplifying the magnetic flux deviation vector.

Next, the configuration, function, and operation of the magnetic flux vector detection section 9 will be described based on FIGS. 6 to 10.

First, the configuration of the magnetic flux vector detection section 9 will be described.

In FIG. 6 showing a configuration diagram of the magnetic flux vector detection section 9, the magnetic flux vector detection section 9 is composed of a filter 91, an orthogonal component extractor 92, and a detected magnetic flux vector calculator 93.

As shown in FIG. 7, the filter 91 is composed of a notch filter 911 and an adder/subtractor 912. As shown in FIG. 8, the orthogonal component extractor 92 is composed of an orthogonal component selector 921 and an amplitude calculator 922. As shown in FIG. 9, the orthogonal component extractor 92 is composed of a difference calculator 931, a cosine calculator 932, a sine calculator 933, and multipliers 934 and 935.

Next, the function and operation of the magnetic flux vector detection section 9 will be described. First, the entire operation of the magnetic flux vector detection section 9 will be described, and then the function and operation of each constituent element will be described.

A mathematical expression of a high-frequency current vector flowing in the AC rotary machine 2 when the high-frequency voltage vector generator 43 in FIG. 2 outputs a high-frequency voltage vector (vdh, vqh) will be described.

As shown in FIG. 10, a coordinate system rotating in synchronization with the rotor of the AC rotary machine 2, formed by the control section 4, is set as orthogonal coordinate d-q axes. The same direction as a rotor magnetic flux vector Φr of the AC rotary machine 2 is set as dm axis, and a direction orthogonal thereto is set as qm axis. The difference between d axis of the orthogonal coordinate system and dm axis of the rotor magnetic flux vector is set as Δθ. It is noted that d axis is the direction of the estimated position θ0 outputted from the adaptive observation section 8. In stationary state, operation is performed such that d axis coincides with dm axis. FIG. 10 shows the case where a deviation of Δθ occurs momentarily.

In this case, a mathematical expression of the AC rotary machine 2 when the high-frequency voltage vector (vdh, vqh) is applied on d axis and q axis, respectively, can be represented as expression (8). Here, p in the expression is a differential operator.

[Mathematical 8]

$$\begin{bmatrix} vdh \\ vqh \end{bmatrix} = \begin{bmatrix} R + pLdc - \omega rLdqc & pLdqc - \omega rLqc \\ pLdqc + \omega rLdc & R + pLqc + \omega rLdqc \end{bmatrix} \begin{bmatrix} idh \\ iqh \end{bmatrix} + \omega r\phi f \begin{bmatrix} -\sin\Delta\theta \\ \cos\Delta\theta \end{bmatrix}$$  (8)

Where $$\begin{cases} Ldc = L - l\cos2\Delta\theta,\ Lqc = L + l\cos2\Delta\theta \\ Ldqc = l\sin2\Delta\theta \\ L = \dfrac{Ld + Lq}{2},\ l = \dfrac{Ld - Lq}{2} \\ R\text{: Stator winding resistance of AC rotary machine 1} \\ Ld\text{: Inductance in } dm\text{-axis direction} \\ Lq\text{: Inductance in } qm\text{-axis direction} \\ \Delta\theta\text{: Position of } dm \text{ axis} - \text{Position of } d \text{ axis} \\ \omega r\text{: Rotational velocity,} \\ \phi f\text{: Magnitude of rotor magnetic flux vector} \\ idh\text{: } d\text{-axis high-frequency current,} \\ iqh\text{: } q\text{-axis high-frequency current} \end{cases}$$

As described above, the high-frequency voltage vector is applied only in a region of zero speed to low speed. Therefore, if the rotational velocity is set at ω≈r0, expression (9) can be obtained.

[Mathematical 9]

$$\begin{bmatrix} vdh \\ vqh \end{bmatrix} = R\begin{bmatrix} idh \\ iqh \end{bmatrix} + p\begin{bmatrix} Ldc & Ldqc \\ Ldqc & Lqc \end{bmatrix}\begin{bmatrix} idh \\ iqh \end{bmatrix}$$  (9)

Further, the second term on the right-hand side is a differential of high-frequency current, and the differential of high-frequency current is multiplied by an angular frequency ωh of the high-frequency voltage. Therefore, the second term on the right-hand side >> the first term on the right-hand side is satisfied, so the first term on the right-hand side can be ignored. As a result, expression (10) can be obtained.

[Mathematical 10]

$$p\begin{bmatrix} idh \\ iqh \end{bmatrix} = \frac{1}{L^2 - l^2}\begin{bmatrix} L + l\cos2\Delta\theta & -l\sin2\Delta\theta \\ -l\sin2\Delta\theta & L - l\cos2\Delta\theta \end{bmatrix}\begin{bmatrix} vdh \\ vqh \end{bmatrix}$$  (10)

Here, if the high-frequency voltage vector is given as shown by expression (11), the high-frequency current vector (idh, iqh) is represented as expression (12) by substituting expression (11) into expression (10) and integrating both sides.

[Mathematical 11]

$$vdh = Vh\sin\omega ht$$  (11)
$$vqh = 0$$

[Mathematical 12]

$$\begin{bmatrix} idh \\ iqh \end{bmatrix} = -\frac{Vh}{\omega h(L^2 - l^2)}\begin{bmatrix} L + l\cos2\Delta\theta & -l\sin2\Delta\theta \\ -l\sin2\Delta\theta & L - l\cos2\Delta\theta \end{bmatrix}\begin{bmatrix} \cos\omega ht \\ 0 \end{bmatrix}$$  (12)
$$= \frac{Vh}{\omega h(L^2 - l^2)}\begin{bmatrix} -L - l\cos2\Delta\theta \\ l\sin2\Delta\theta \end{bmatrix}\cos\omega ht$$

Next, the detected magnetic flux vector will be described. As shown in FIG. 10, the rotor magnetic flux vector Φr is directed in the same direction as dm axis. Here, the rotor magnetic flux vector Φr is projected to a direction parallel to the high-frequency voltage vector, to be φdrD in the d-axis direction, and a direction orthogonal to the high-frequency voltage vector, to be φqrD in the q axis direction. Then, the φdrD and φqrD projected on d axis and q axis are set as the detected magnetic flux vector, and mathematical expressions thereof can be represented as expression (13).

[Mathematical 13]

$$\phi drD = |\Phi r|\cos\Delta\theta$$  (13)
$$= \phi f\cos\Delta\theta$$
$$\phi qrD = |\Phi r|\sin\Delta\theta$$
$$= \phi f\sin\Delta\theta$$

In expression (13), φf is the magnitude of the rotor magnetic flux vector Φr. In the case of permanent magnet synchronous machine, although φf slightly varies depending on the temperature, φf can be known by measuring φf in advance. In the case of induction machine or winding-field-type synchronous machine, φf can be calculated from the magnitude of excited current or field current. Thus, φf is a known value.

Since φf is a known value, it is only necessary to know Δθ, for calculating the detected magnetic flux vector from expression (13).

Here, a method for calculating Δθ will be discussed. Since Δθ is the difference between d axis and dm axis, Δθ can be calculated by obtaining the position of d axis and the position of dm axis. The position of d axis is the estimated position θ0 outputted from the adaptive observation section 8, and therefore is known. However, the position (hereinafter, referred to as θdm) of dm axis is not known, and therefore needs to be calculated by another method.

For example, as disclosed in International Publication No. WO2009-040965, an estimated position calculated by superimposing high-frequency voltage that allows suitable estimation of a position of the dm-axis direction even in a region of zero speed to low speed is used as θdm, whereby Δθ can be calculated. However, in the case of calculating Δθ by the disclosed method, it is necessary to newly provide a position estimation section, for calculating θdm, and therefore the computing amount greatly increases.

In the present embodiment 1, looking at expression (12), Δθ is included in the magnitude of the high-frequency current vector. Therefore, instead of performing position estimation, although a high-frequency voltage vector is superimposed, the magnitude of the high-frequency current vector is extracted, whereby the detected magnetic flux vector is calculated.

In the present embodiment 1, the magnitude of the high-frequency current vector iqh on q axis which is orthogonal to the high-frequency voltage vector, is used.

From expression (12), a magnitude |iqh| of the high-frequency current vector iqh is represented by expression (14), and therefore Δθ can be calculated as shown by expression (15).

[Mathematical 14]

$$|iqh| = \frac{Vhl}{\omega h(L^2 - l^2)} \sin 2\Delta\theta \quad (14)$$

[Mathematical 15]

$$\Delta\theta = \frac{\sin^{-1}\left\{\frac{|iqh|\omega h(L^2 - l^2)}{Vhl}\right\}}{2} \quad (15)$$

It is noted that the magnitude |iqh| of the high-frequency current vector can be calculated by expression (16). Since the angular frequency ωh and a high-frequency voltage amplitude Vh of the high-frequency voltage can be freely set in the high-frequency voltage vector generator 43, they are known values. L and l can be calculated from Ld and Lq as shown by expression (8). In addition, since Ld and Lq can be known by measuring them in advance, L and l are also known values. It is noted that T in expression (16) is the period of the high-frequency current vector (idh, iqh).

[Mathematical 16]

$$|iqh| = \sqrt{\frac{2}{T}\int_0^T iqh^2\, dt} \quad (16)$$

As described above, the detected magnetic flux vectors φdrD and φqrD are calculated by expressions (13), (15), and (16).

It is noted that since the estimated position θ0 outputted from the adaptive observation section 8 is equal to or close to a direction of the rotor magnetic flux vector Φr, 2Δθ≈0 is satisfied, and sin 2Δθ can be approximated as sin 2Δθ≈2Δθ. Therefore, Δθ may be calculated as shown by expression (17). In this case, the detected magnetic flux vector (φdrD, φqrD) can be calculated from expressions (13), (16), and (17).

[Mathematical 17]

$$\Delta\theta = \frac{|iqh|\omega h(L^2 - l^2)}{2Vhl} = \quad (17)$$

The above is the entire operation of the magnetic flux vector detection section 9.

Next, the function and operation of each constituent element of the magnetic flux vector detection section 9 will be described.

In FIG. 6, the filter 91 is for extracting a high-frequency current vector from a detected current vector, and may be any type as long as the filter can extract the same frequency component as a high-frequency voltage vector from a detected current vector. For example, as shown in FIG. 7, a high-frequency current vector can be extracted by using a notch filter known as a band stop filter having a narrow band. In a notch filter 911 in FIG. 7, a notch filter for eliminating the angular frequency ωh of the high-frequency voltage vector in expression (18) is applied to a detected current vector, whereby an angular frequency ωh component is eliminated from the detected current vector.

The adder/subtractor 912 subtracts output of the notch filter 911 from the detected current vector, thereby calculating a high-frequency current vector corresponding to the angular frequency ωh component from the detected current vector. It is noted that s in expression (18) is Laplace operator and qx is the depth of notch.

[Mathematical 18]

$$\frac{s^2 + \omega h^2}{s^2 + \frac{\omega h}{qx}s + \omega h^2} = \quad (18)$$

In FIG. 8, in the orthogonal component extractor 92, the orthogonal component selector 921 multiplies the high-frequency current vector (idh, iqh) by a matrix $(0, 1)^T$, thereby selecting only iqh which is a component orthogonal to d axis, of the high-frequency current vector.

The amplitude calculator 922 performs calculation by expression (16), to calculate |iqh| which is the magnitude (amplitude) of iqh, and outputs |iqh|.

In the detected magnetic flux vector calculator 93 in FIG. 9, the difference calculator 931 performs calculation by expression (15) or (17) using |iqh| outputted from the orthogonal component extractor, and thereby outputs Δθ.

The cosine calculator 932 performs cosine calculation using Δθ outputted from the difference calculator 931, and thereby outputs cos Δθ. The multiplier 934 multiplies cos Δθ outputted from the cosine calculator 932 by the magnitude φf of the rotor magnetic flux, and thereby outputs φdrD which is a detected magnetic flux vector component parallel to the high-frequency voltage vector.

The sine calculator 933 performs sine calculation using Δθ outputted from the difference calculator 931, and thereby outputs sin Δθ. The multiplier 935 multiplies sin Δθ outputted from the sine calculator 933 by the magnitude φf the rotor magnetic flux, and thereby outputs φqrD which is a detected magnetic flux vector component orthogonal to the high-frequency voltage vector.

The above is the description of the configuration, function, and operation of the magnetic flux vector detection section 19.

Next, a modification of the present embodiment 1 will be described.

In the deviation amplification section 7 in FIG. 3, the matrixes Hc and Hf are gain matrixes defined by expression (1). In expression (1), h11 to h44 are amplification gains, and the values of h11 to h44 can be freely set.

Here, for example, as described in FIG. 9 of Japanese Patent No. 4672236, for h11 to h42 of the matrix Hc, the value of each amplification gain can be changed depending on the estimated velocity ωr0. Also, for h13 to h44 of the gain matrix Hf, the value of each amplification gain can be changed depending on the estimated velocity ωr0.

In this case, as shown by a system configuration diagram of the modification in FIG. 11, the adaptive observation section 8 also outputs the estimated velocity ωr0. In addition, as shown in FIG. 12, in a deviation amplification section 70, the estimated velocity ωr0 is inputted to gain matrix calculators 701 and 702.

In FIG. 12, the adder/subtractor 73 adds vectors outputted from the gain matrix calculator 701 and the gain matrix calculator 702, and thereby outputs the amplified deviation vector (e1, e2, e3, e4)$^T$.

In addition, as described above, in the case where the absolute value of the estimated velocity ωr0 is great, the values of h13 to h44 are set at zero in the gain matrix calculator 702 so that output of the gain matrix calculator 702 in a high rotational speed region becomes zero.

As described above, the control device 1 for AC rotary machine according to embodiment 1 calculates the magnetic flux deviation vector which is a deviation between the detected magnetic flux vector and the estimated magnetic flux vector, and the current deviation vector which is a deviation between the detected current vector and the estimated current vector, and uses the amplified deviation vector obtained by amplifying the magnetic flux deviation vector, thereby making it possible to drive an AC rotary machine by using only one kind of estimated velocity or estimated position outputted from the adaptive observation section over a range from zero speed to high-speed region. Therefore, it is not necessary to cause both the low-frequency region phase generator and the high-frequency region phase generator to perform computing processing simultaneously, so the amount of computing processing can be greatly reduced.

Further, in calculation of the detected magnetic flux vector (φdrD, φqrD) outputted from the magnetic flux vector detection section, a high-frequency current vector having the same frequency component as a high-frequency voltage vector is extracted from the detected current vector. Of the extracted high-frequency current vector, by using the magnitude |iqh| of iqh which is a component orthogonal to the high-frequency voltage vector, the difference Δθ, which is included in |iqh|, between d axis on which the high-frequency voltage vector is applied and dm axis which is parallel to the rotor magnetic flux vector is calculated, and then only Δθ and the magnitude φf the rotor magnetic flux vector are used. Therefore, it is not necessary to prepare the rotor angle in advance, for calculating the detected magnetic flux vector, and therefore an effect of reducing the computing amount is provided. In addition, since response of estimation of the rotor angle is not relevant to the calculation of the detected magnetic flux vector at all, an effect of maintaining response performance such as velocity control response or torque control response at a high level is provided.

Embodiment 2

In a control device for AC rotary machine according to embodiment 2, in calculation of the detected magnetic flux vector (φdrD, φqrD), the magnetic flux vector detection section 9 extracts, from a detected current vector, a high-frequency current vector having the same frequency component as the high-frequency voltage vector. Of the extracted high-frequency current vector, by using the magnitude |idh| of idh which is a component parallel to the high-frequency voltage vector, the difference Δθ, which is included in |idh|, between d axis on which the high-frequency voltage vector is applied and dm axis which is parallel to the rotor magnetic flux vector is calculated, and then only Δθ and the magnitude φf the rotor magnetic flux vector are used.

In the present embodiment 2, the configuration is the same as in embodiment 1 except for the magnetic flux vector detection section, so the description of a part other than the magnetic flux vector detection section is omitted.

Figure 13:
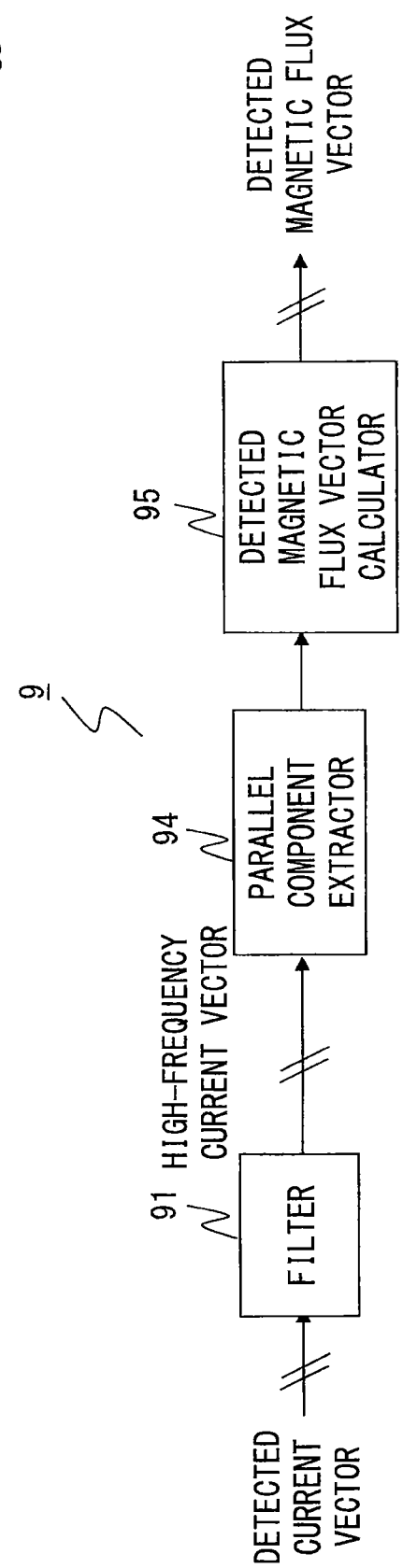
FIG. 13 is a configuration diagram of a magnetic flux vector detection section according to a control device for AC rotary machine of embodiment 2 of the present invention.
Figure 14:
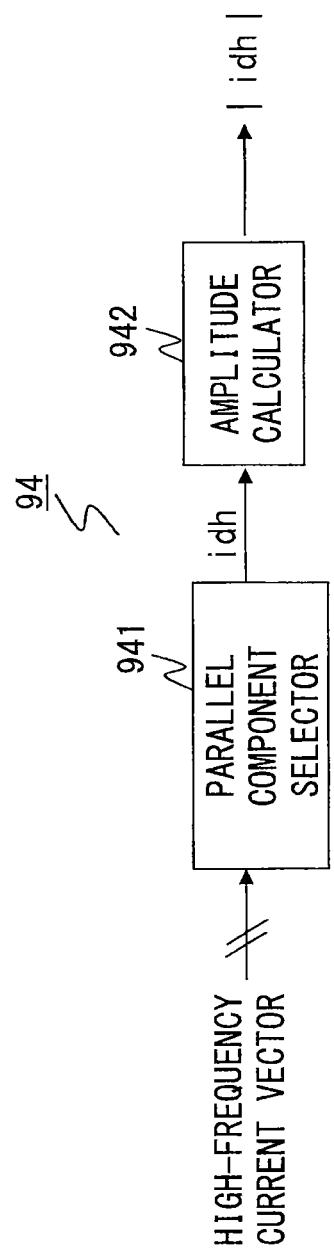
FIG. 14 is an internal configuration diagram of the magnetic flux vector detection section according to the control device for AC rotary machine of embodiment 2 of the present invention.
Figure 15:
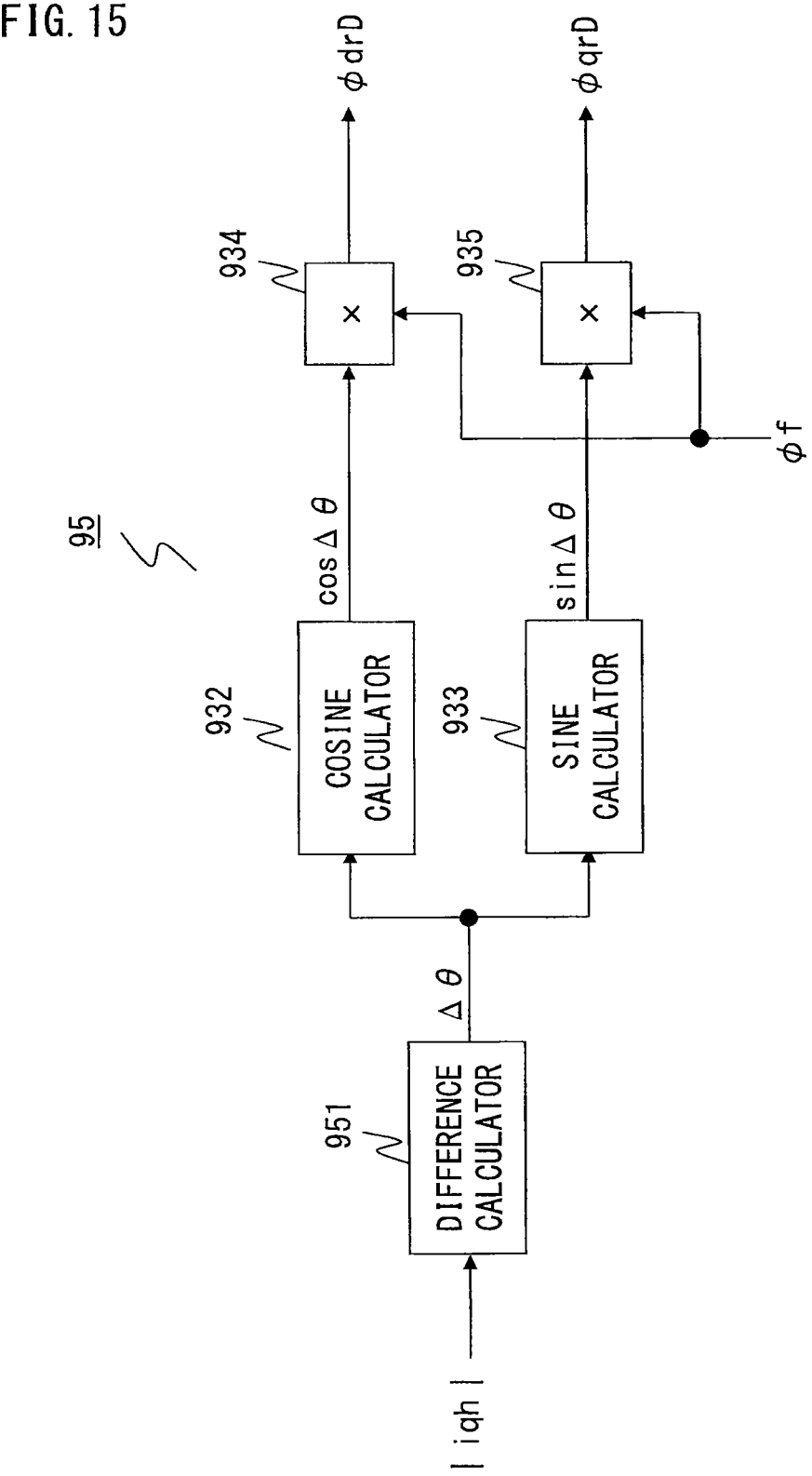
FIG. 15 is an internal configuration diagram of the magnetic flux vector detection section according to the control device for AC rotary machine of embodiment 2 of the present invention.

Hereinafter, embodiment 2 of the present invention will be described based on FIGS. 13 to 15 showing a configuration diagram and an internal configuration diagram of the magnetic flux vector detection section 9 according to the control device for AC rotary machine.

In FIGS. 13 to 15, components that are the same as or correspond to those in FIGS. 6 to 9 of embodiment 1 are denoted by the same reference characters.

FIG. 13 is a configuration diagram of the magnetic flux vector detection section 9 of the present embodiment. In FIG. 13, parts different from embodiment 1 are only a parallel component extractor 94 and a detected magnetic flux vector calculator 95. The filter 91 is the same as in embodiment 1, so the description thereof is omitted.

FIG. 14 is a configuration diagram of the parallel component extractor 94. A parallel component selector 941 multiplies the high-frequency current vector (idh, iqh) by a matrix $(1, 0)^T$, thereby selecting only idh which is a high-frequency current vector parallel to d axis. An amplitude calculator 942 calculates the magnitude |idh| of idh by expression (19), and outputs the magnitude |idh|.

[Mathematical 19]

$$|idh| = \sqrt{\frac{2}{T}\int_0^T idh^2\, dt} \quad (19)$$

FIG. 15 is a configuration diagram of the detected magnetic flux vector calculator 95. From expression (12), |idh| outputted from the parallel component extractor 94 is represented by expression (20). A difference calculator 951 performs calculation by expressions (20) and (21), and thereby outputs Δθ.

[Mathematical 20]

$$|idh| = -\frac{Vh}{\omega h(L^2 - l^2)}(L + l\cos 2\Delta\theta) \quad (20)$$

[Mathematical 21]

$$\Delta\theta = \frac{\cos^{-1}\left\{\frac{|idh|\omega h(L^2 - l^2)}{Vhl} + L\right\}}{2} \quad (21)$$

The cosine calculator 932 performs cosine calculation using Δθ outputted from the difference calculator 951, and thereby outputs cos Δθ. The multiplier 934 multiplies cos Δθ outputted from the cosine calculator 932 by the magnitude φf the rotor magnetic flux, and thereby outputs the resultant value as φdrD which is a detected magnetic flux vector parallel to the high-frequency voltage vector.

The sine calculator 933 performs sine calculation using Δθ outputted from the difference calculator 951, and thereby outputs sin Δθ. The multiplier 935 multiplies sin Δθ outputted from the sine calculator 933 by the magnitude φf the rotor magnetic flux, and thereby outputs the resultant value as φqrD which is a detected magnetic flux vector orthogonal to the high-frequency voltage vector.

As described above, in the control device for AC rotary machine according to embodiment 2, in calculation of the detected magnetic flux vector (φdrD, φqrD) outputted from the magnetic flux vector detection section 9, a high-frequency current vector having the same frequency component as a high-frequency voltage vector is extracted from the detected current vector. Of the extracted high-frequency current vector, by using the magnitude |idh| of idh which is a component parallel to the high-frequency voltage vector, the difference Δθ, which is included in |idh|, between d axis on which the high-frequency voltage vector is applied and dm axis which is parallel to the rotor magnetic flux vector is calculated, and then only Δθ and the magnitude φf the rotor magnetic flux vector are used. Therefore, as in embodiment 1, an effect of reducing the computing amount and an effect of maintaining response performance such as velocity control response or torque control response at a high level are provided.

Embodiment 3

In embodiment 1, the detected current vector outputted from the current vector detection section is a detected current vector on d-q axes which are an orthogonal coordinate system rotating in synchronization with the rotor of the AC rotary machine, and the control section, the deviation vector calculation section, the deviation amplification section, the adaptive observation section, and the magnetic flux vector detection section are also configured on d-q axes.

On the other hand, in the present embodiment 3, the detected current vector outputted from the current vector detection section is a detected current vector (iα, iβ) on α-β axes which are known as an orthogonal coordinate system at rest, and the control section, the deviation vector calculation section, the deviation amplification section, the adaptive observation section, and the magnetic flux vector detection section are also configured on α-β axes.

Figure 16:
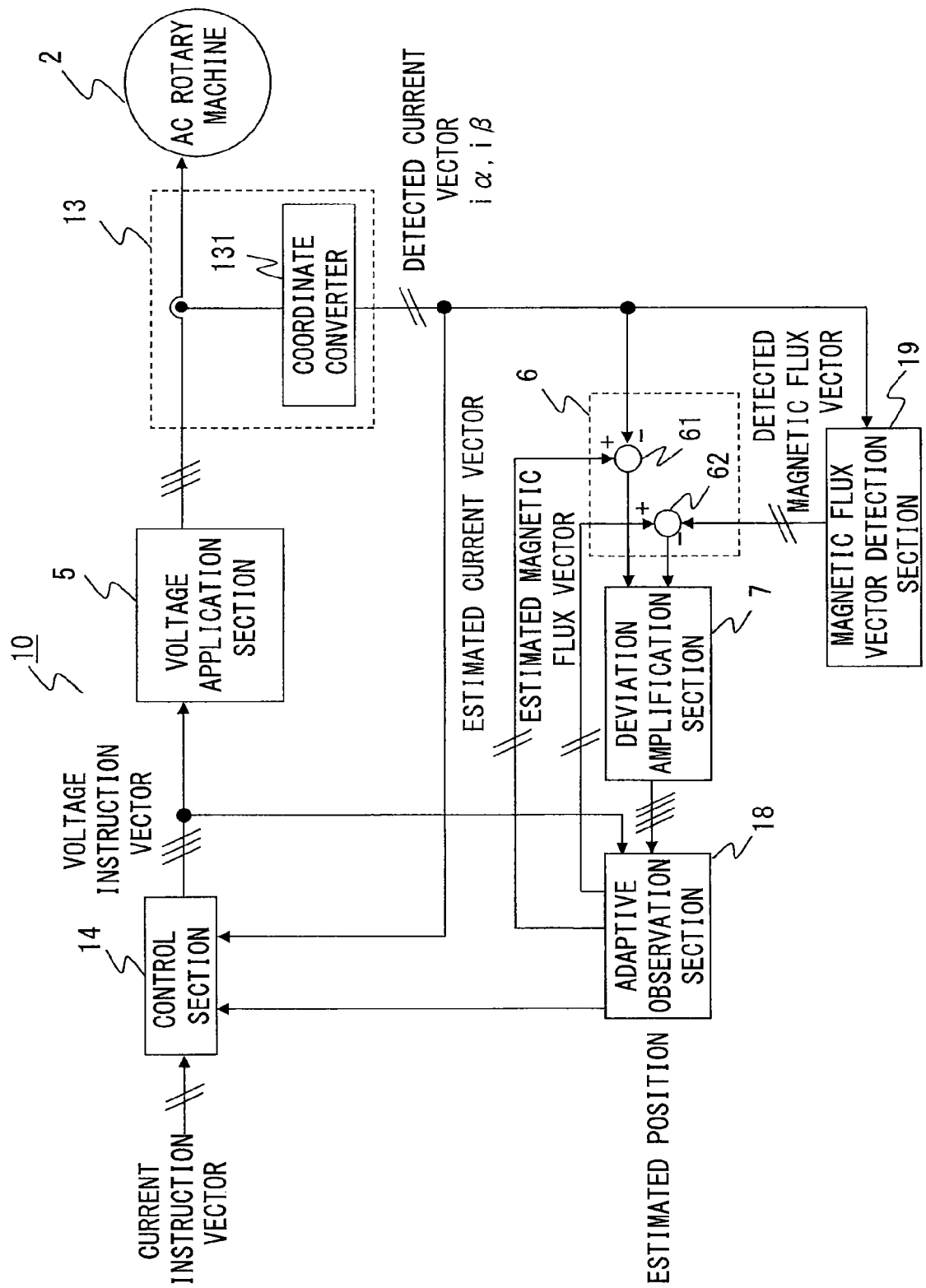
FIG. 16 is a system configuration diagram according to a control device for AC rotary machine of embodiment 3 of the present invention.
Figure 17:
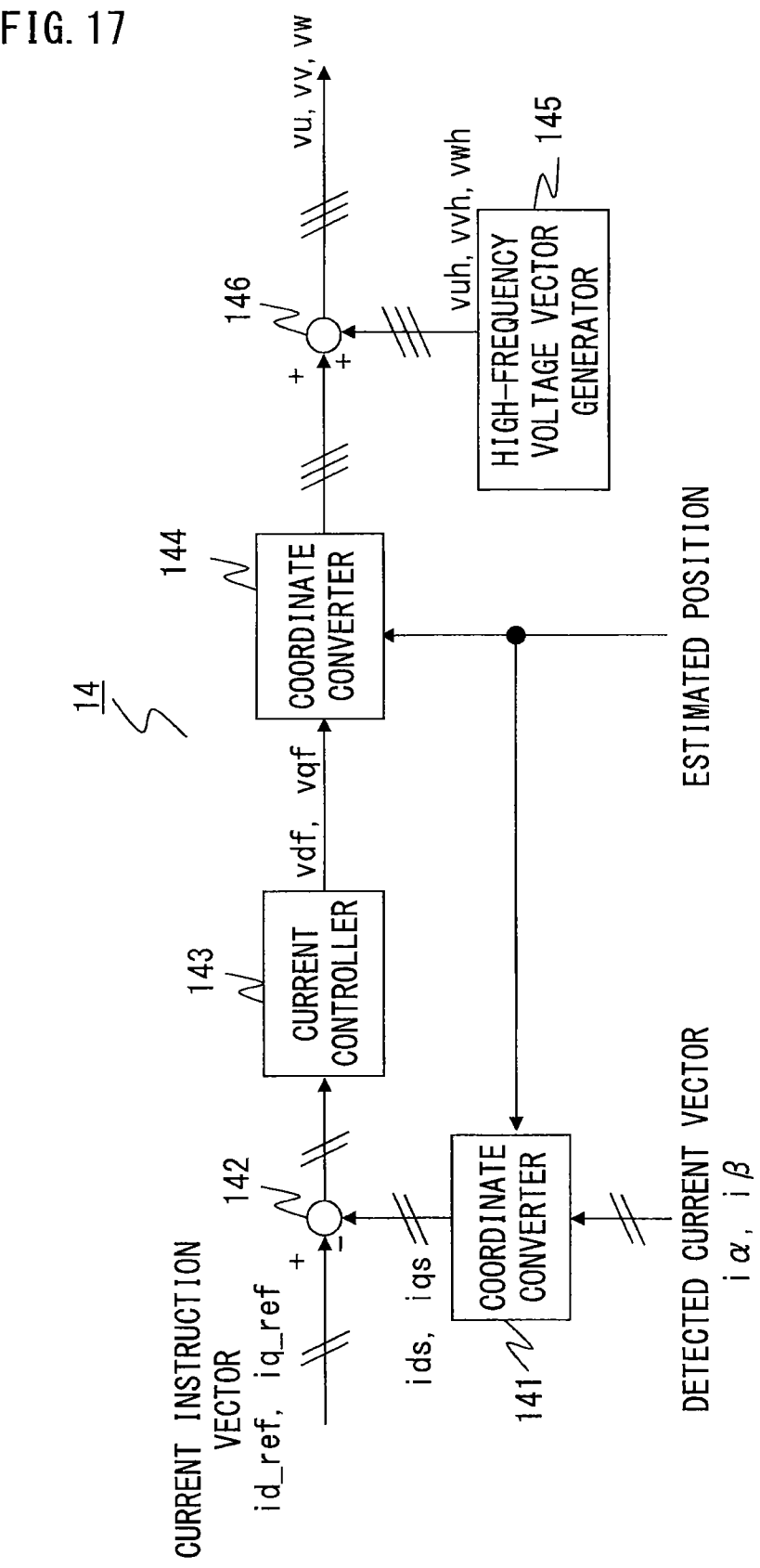
FIG. 17 is a configuration diagram of a control section according to the control device for AC rotary machine of embodiment 3 of the present invention.
Figure 18:
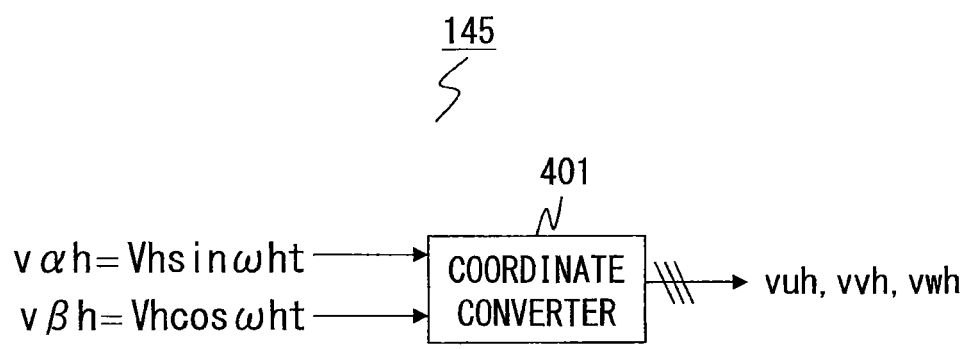
FIG. 18 is an internal configuration diagram of the control section according to the control device for AC rotary machine of embodiment 3 of the present invention.
Figure 19:
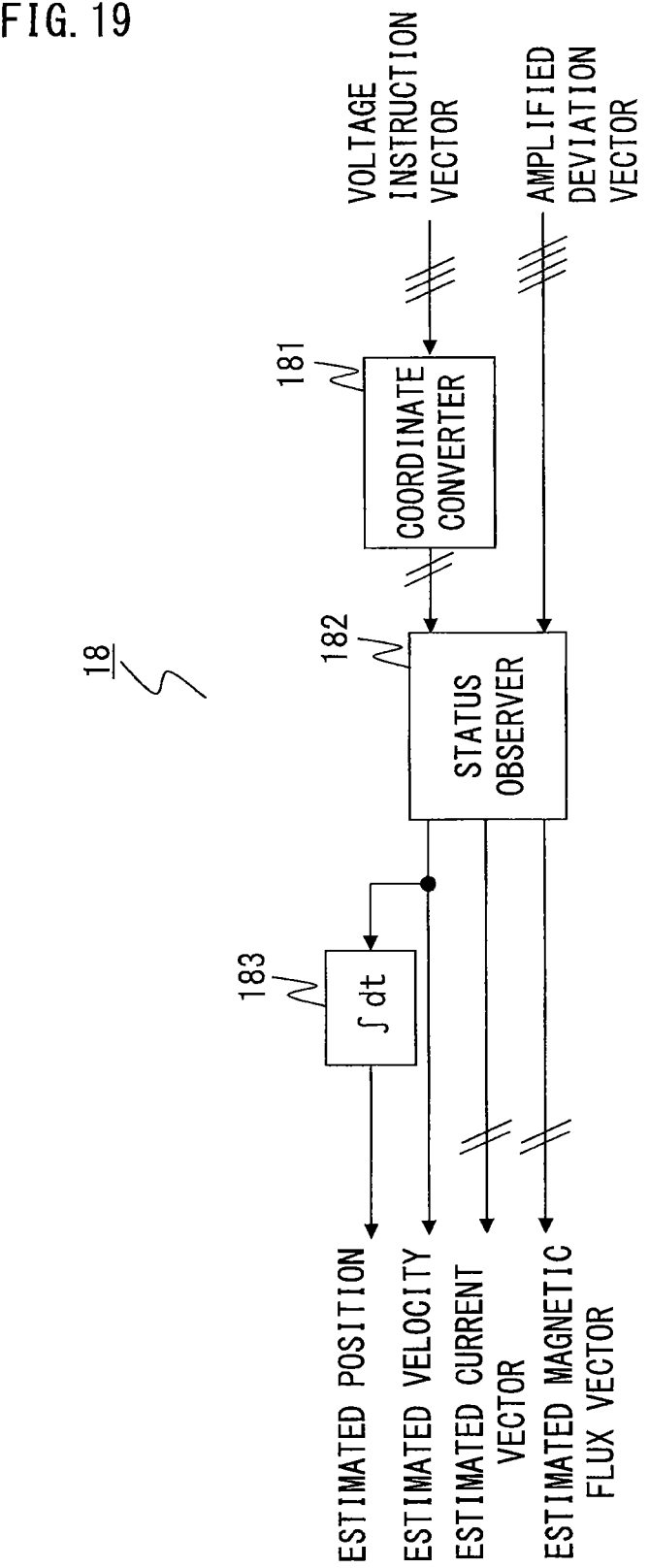
FIG. 19 is a configuration diagram of an adaptive observation section according to the control device for AC rotary machine of embodiment 3 of the present invention.
Figure 20:
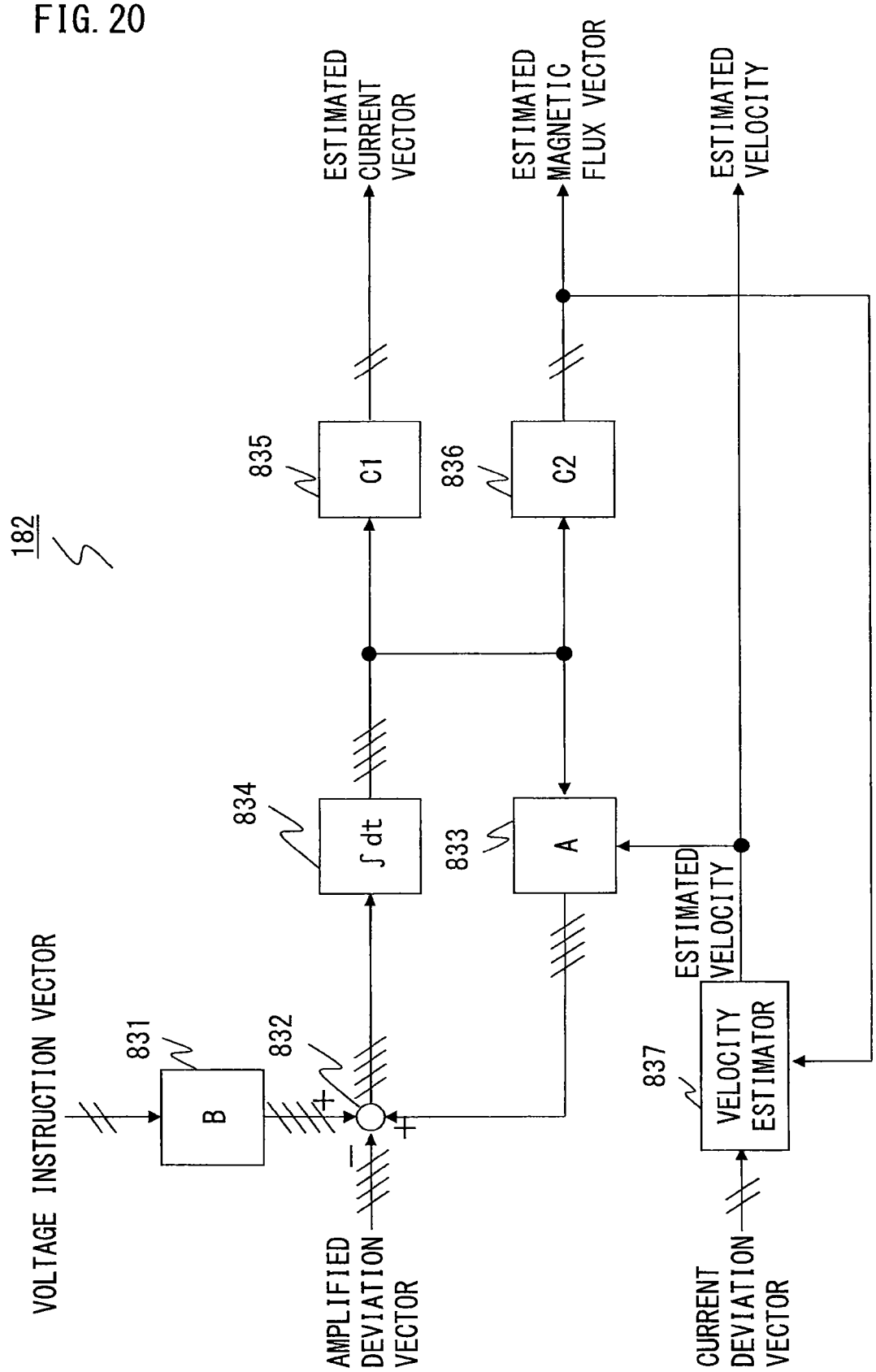
FIG. 20 is an internal configuration diagram of the adaptive observation section according to the control device for AC rotary machine of embodiment 3 of the present invention.
Figure 21:
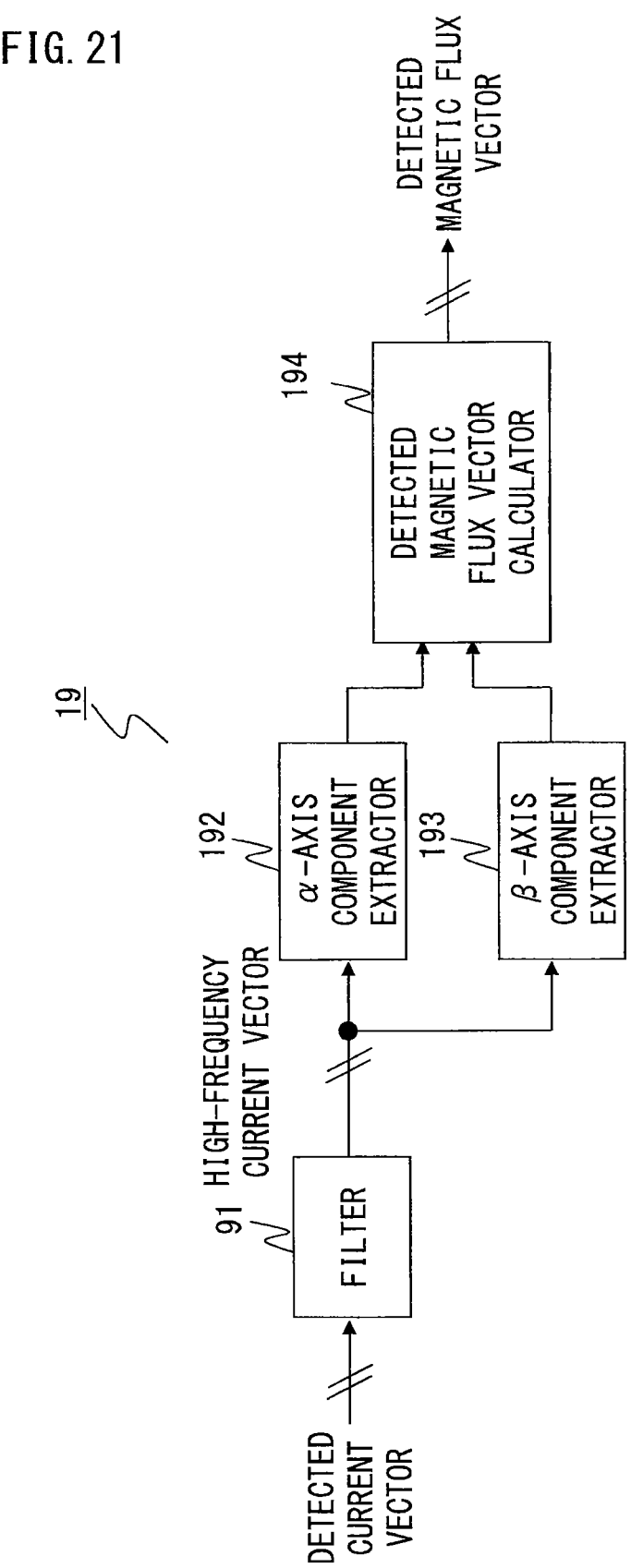
FIG. 21 is a configuration diagram of a magnetic flux vector detection section according to the control device for AC rotary machine of embodiment 3 of the present invention.
Figure 22:
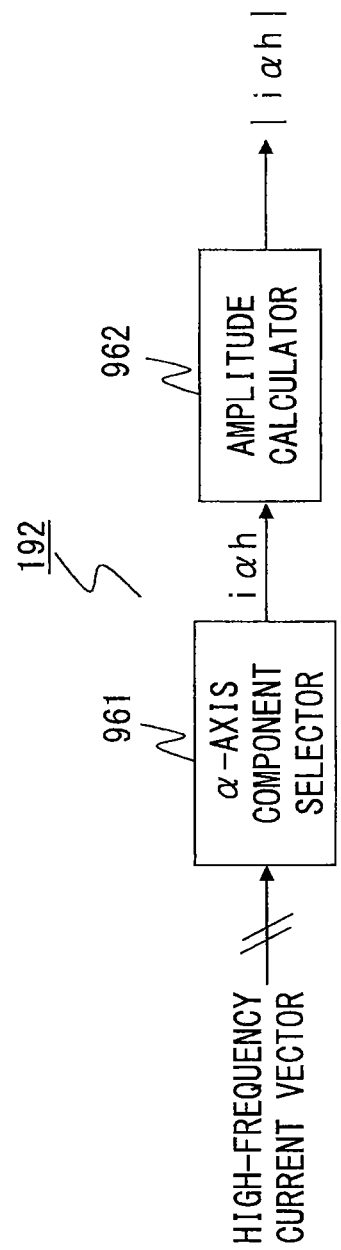
FIG. 22 is an internal configuration diagram of the magnetic flux vector detection section according to the control device for AC rotary machine of embodiment 3 of the present invention.
Figure 23:
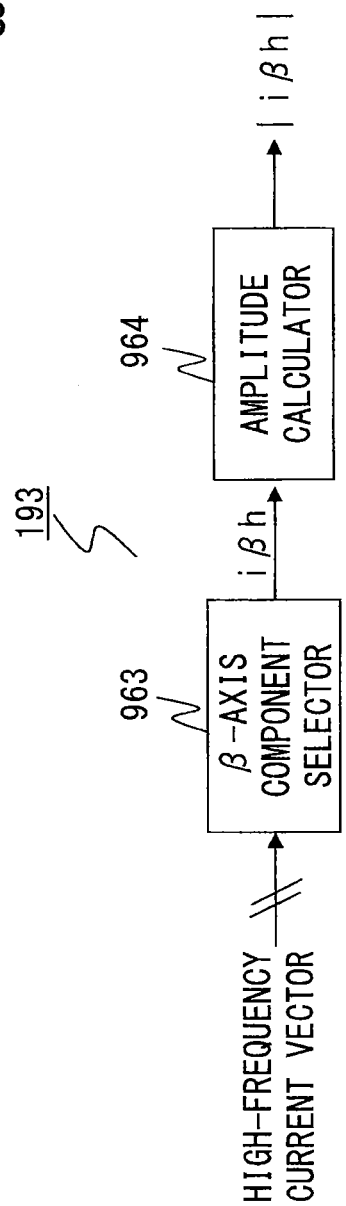
FIG. 23 is an internal configuration diagram of the magnetic flux vector detection section according to the control device for AC rotary machine of embodiment 3 of the present invention.
Figure 24:
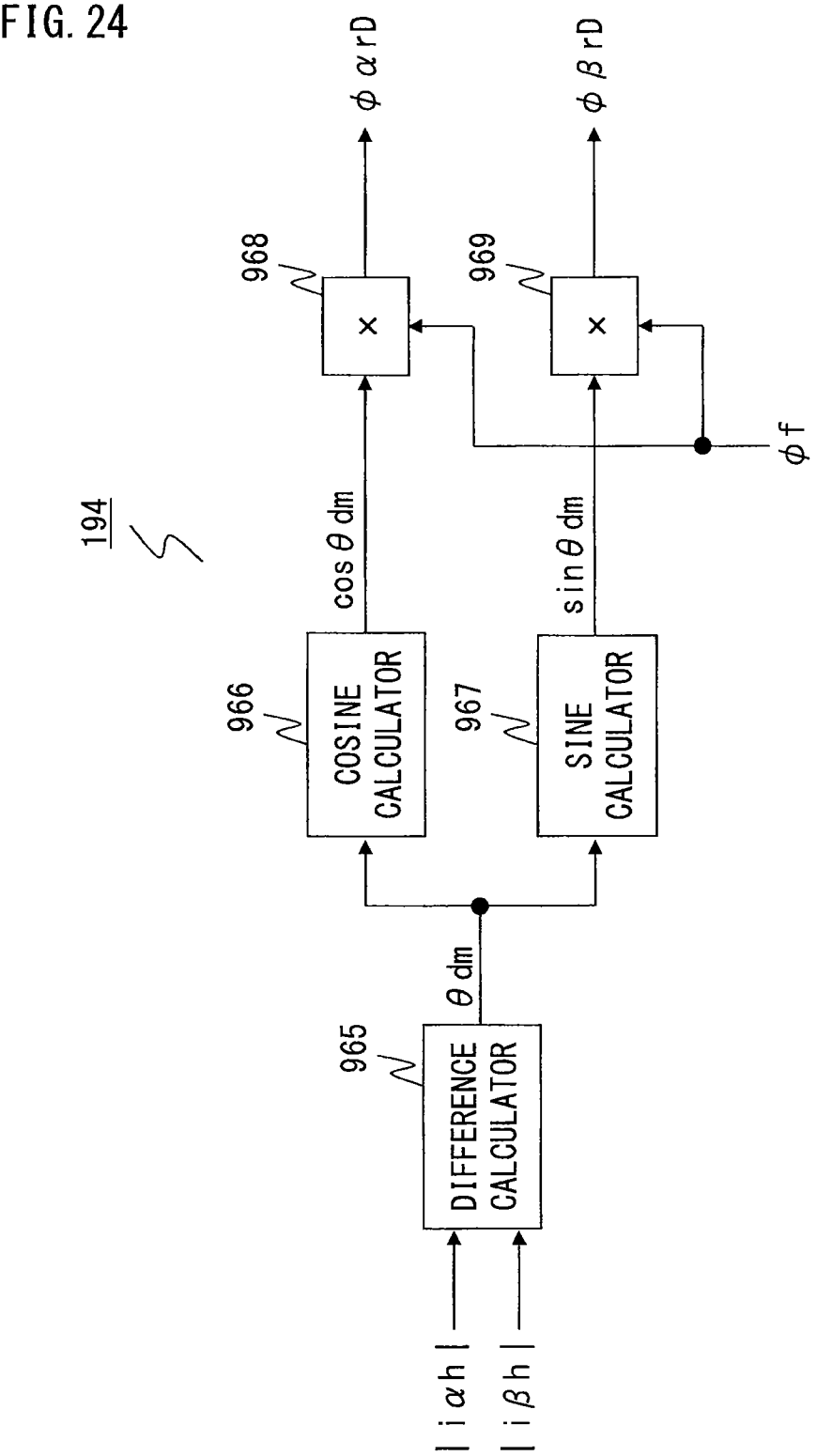
FIG. 24 is an internal configuration diagram of the magnetic flux vector detection section according to the control device for AC rotary machine of embodiment 3 of the present invention.
Figure 25:
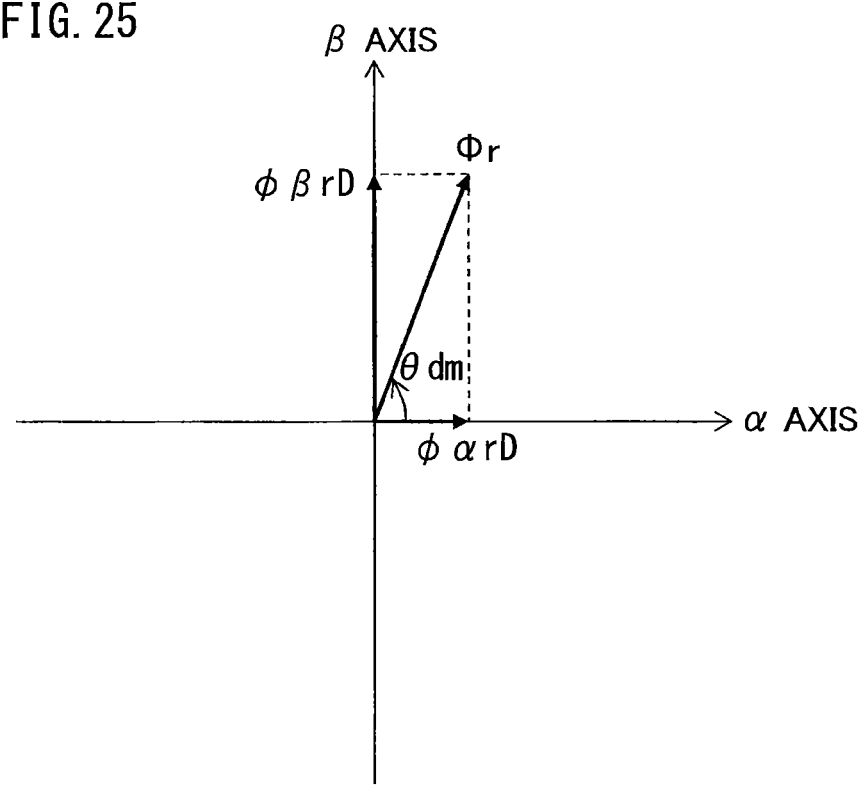
FIG. 25 is an explanation diagram of a rotor magnetic flux vector according to the control device for AC rotary machine of embodiment 3 of the present invention.

Hereinafter, embodiment 3 of the present invention will be described based on FIG. 16 showing a system configuration diagram of a control device 10 for AC rotary machine, FIG. 17 showing a configuration diagram of a control section, FIG. 18 showing an internal configuration diagram of the control section, FIG. 19 showing a configuration diagram of an adaptive observation section, FIG. 20 showing an internal configuration diagram of the adaptive observation section, FIG. 21 showing a configuration diagram of a magnetic flux vector detection section, FIGS. 22 to 24 showing internal configuration diagrams of the magnetic flux vector detection section, and FIG. 25 showing an explanation diagram of a rotor magnetic flux vector.

First, the entire system configuration including the control device 10 for AC rotary machine according to embodiment 3 of the present invention will be described.

In FIG. 16, the control device 10 for AC rotary machine is composed of a current vector detection section 13, a control section 14, the voltage application section 5, the deviation vector calculation section 6, the deviation amplification section 7, an adaptive observation section 18, and a magnetic flux vector detection section 19, in order to control the AC rotary machine 2.

In FIG. 16, components that are the same as or correspond to those in FIG. 1 are denoted by the same reference characters.

The control device 10 for AC rotary machine of embodiment 3 is different from the control device 1 for AC rotary machine of embodiment 1 only in the configurations of the current vector detection section 13, the control section 14, the adaptive observation section 18, and the magnetic flux vector detection section 19. Therefore, hereinafter, the configuration, function, and operation of each constituent part of the control device 10 for AC rotary machine will be described in order, focusing on the difference.

The current vector detection section 13 detects three-phase current flowing in the AC rotary machine 2, and outputs, as a detected current vector (iα, iβ), α-axis current iα and β-axis current iβ which are respectively obtained by a coordinate converter 131 performing coordinate conversion of the three-phase current into an α-axis direction and a β-axis direction on α-β axes which are an orthogonal coordinate system at rest of the rotor of the AC rotary machine 2.

Next, based on FIG. 17, the configuration, function, and operation of the control section 14 will be described.

The control section 14 is composed of a coordinate converter 141, an adder/subtractor 142, a current controller 143, a coordinate converter 144, a high-frequency voltage vector generator 145, and an adder/subtractor 146.

It is noted that computing by the control section 14 is performed on d-q axes. The coordinate converter 141 converts the detected current vector (iα, iβ) into a vector on d-q axes by using an estimated position θ0 outputted from the adaptive observation section 18 described later. The adder/subtractor 142 subtracts a detected current vector (ids, iqs) outputted from the coordinate converter 141, from a current instruction vector (id_ref, iq_ref) given from the outside. The current controller 143 performs proportional integral control so that the deviation between the current instruction vector and the detected current vector, outputted from the adder/subtractor 142, becomes zero, and outputs a fundamental wave voltage vector (vdf, vqf). The coordinate converter 144 converts the fundamental wave voltage vector (vdf, vqf) into a voltage instruction vector (vuf, vvf, vwf) in a coordinate system at rest from d-q axes, by using the estimated position θ0, and outputs the voltage instruction vector (vuf, vvf, vwf).

In the high-frequency voltage vector generator 145, as shown in the configuration diagram of the high-frequency voltage vector generator 145 in FIG. 18, a high-frequency voltage instruction vector (vαh, vβh) represented by expression (22) on α-β axes which are an orthogonal coordinate system at rest is given, and then converted into a high-frequency voltage vector instruction (vuh, vvh, vwh) in a coordinate system at rest by a coordinate converter 401, and then the high-frequency voltage vector instruction (vuh, vvh, vwh) is outputted.

In the present embodiment 3, since the high-frequency voltage vector instruction is thus given, a rotational-voltage high-frequency voltage vector instruction can be given unlike alternating voltage of embodiment 1.

[Mathematical 22]

$v\alpha h = Vh \sin \omega ht$ $v\beta h = Vh \cos \omega ht$ (22)

The adder/subtractor 146 adds the voltage instruction vector (vuf, vvf, vwf) outputted from the coordinate converter 144 and the high-frequency voltage vector instruction (vuh, vvh, vwh), and thereby outputs the voltage instruction vector (vu, vv, vw).

Next, the deviation vector calculation section 6 will be described.

The deviation vector calculation section 6, as in embodiment 1, although its input and output are changed from d-q axes to α-β axes, outputs a current deviation vector (eiα, eiβ) which is a difference between an estimated current vector (iα0, iβ0) and the detected current vector (iα, iβ), and a magnetic flux deviation vector (eφαr, eφβr) which is a difference between an estimated magnetic flux vector (φαr0, φβr0) and a detected magnetic flux vector (φαrD, φβrD).

Next, the deviation amplification section 7 will be described.

Also the deviation amplification section 7, as in embodiment 1, although its input and output are changed from d-q axes to α-β axes, outputs an amplified deviation vector (e1, e2, e3, e4) obtained by adding the current deviation vector (eiα, eiβ) multiplied by the matrix Hc of expression (1) and the magnetic flux deviation vector (eφαr, eφβr) multiplied by the matrix Hf of expression (1).

Next, the adaptive observation section 18 will be described. Also for the adaptive observation section 18, the basic configuration is the same as that of the adaptive observation section 8 of embodiment 1, but the matrix A and the matrix C1 therein are different.

FIG. 19 is a configuration diagram of the adaptive observation section 18, and FIG. 20 is a configuration diagram of a status observer 182 which is a main constituent element of the adaptive observation section 18.

In FIG. 19, the adaptive observation section 18 is composed of a coordinate converter 181, the status observer 182, and an integrator 183.

In FIG. 20, the status observer 182 is composed of gain matrix calculators 831, 833, 835, and 836, an adder/subtractor 832, an integrator 834, and a velocity estimator 837.

Next, the entire operation of the adaptive observation section 18 will be described.

In the adaptive observation section 18, the following expressions (23) to (25) respectively correspond to calculations by expressions (2) to (4) in the adaptive observation section 8 of embodiment 1, and the following expressions (26) and (27) respectively correspond to calculations by expressions (6) and (7).

[Mathematical 23]

$$A = \begin{pmatrix} -\frac{R}{L\alpha} & 0 & 0 & \omega r0 \\ 0 & -\frac{R}{L\beta} & -\omega r0 & 0 \\ 0 & 0 & 0 & -\omega r0 \\ 0 & 0 & \omega r0 & 0 \end{pmatrix}, \quad (23)$$

$$B = \begin{pmatrix} 1 & 0 \\ 0 & 1 \\ 0 & 0 \\ 0 & 0 \end{pmatrix}, \quad C1 = \begin{pmatrix} \frac{1}{L\alpha} & 0 & 0 & 0 \\ 0 & \frac{1}{L\beta} & 0 & 0 \end{pmatrix}, \quad C2 = \begin{pmatrix} 0 & 0 & 1 & 0 \\ 0 & 0 & 0 & 1 \end{pmatrix}$$

[Mathematical 24]

$$\frac{d}{dt}\begin{pmatrix} \phi\alpha s0 \\ \phi\beta s0 \\ \phi\alpha r0 \\ \phi\beta r0 \end{pmatrix} = A\begin{pmatrix} \phi\alpha s0 \\ \phi\beta s0 \\ \phi\alpha r0 \\ \phi\beta r0 \end{pmatrix} + B\begin{pmatrix} v\alpha s \\ v\beta s \end{pmatrix} - \begin{pmatrix} e1 \\ e2 \\ e3 \\ e4 \end{pmatrix} \quad (24)$$

[Mathematical 25]

$$\omega r0 = \left(kp + \frac{ki}{s}\right)(ei\beta s \cdot \phi\alpha r0 - ei\alpha s \cdot \phi\beta r0) \quad (25)$$

[Mathematical 26]

$$\begin{pmatrix} i\alpha s0 \\ i\beta s0 \end{pmatrix} = C1\begin{pmatrix} \phi\alpha s0 \\ \phi\beta s0 \\ \phi\alpha r0 \\ \phi\beta r0 \end{pmatrix} \quad (26)$$

[Mathematical 27]

$$\begin{pmatrix} \phi\alpha r0 \\ \phi\beta r0 \end{pmatrix} = C2\begin{pmatrix} \phi\alpha s0 \\ \phi\beta s0 \\ \phi\alpha r0 \\ \phi\beta r0 \end{pmatrix} \quad (27)$$

Next, the function and operation of each main constituent element of the adaptive observation section 18 will be described.

In FIG. 19, the coordinate converter 181 converts a three-phase AC voltage instruction vector outputted from the control section 14 into a voltage instruction vector (vαs, vβs) on α-β axes which are an orthogonal coordinate system at rest, and outputs the voltage instruction vector (vαs, vβs) to the status observer 182. In the status observer 182 in FIG. 20, the gain matrix calculator 831 multiplies the voltage instruction vector (vαs, vαs)$^T$ outputted from the coordinate converter 181, by the matrix B of expression (23), and outputs the result. The adder/subtractor 832 outputs a vector obtained by addition and subtraction among output of the gain matrix calculator 831, output of the gain matrix calculator 833, and the amplified deviation vector (e1, e2, e3, e4)$^T$. The integrator 834 integrates each element of the vector outputted from the adder/subtractor 832, and outputs the resultant value as a vector (φαs0, φβs0, φαr0, φβr0)$^T$. The above corresponds to the right-hand side of expression (24). The left-hand side of expression (24) corresponds to input to the integrator 834.

The gain matrix calculator 835 multiplies the vector (φαs0, φβs0, φαr0, φβr0)$^T$ by the matrix C1 of expression (23) and thereby outputs the estimated current vector (φαs0, φβs0)$^T$. This corresponds to expression (26).

Here, the vector (φαs0, φβs0, φαr0, φβr0)$^T$ is a stator/rotor estimated magnetic flux vector.

The gain matrix calculator 836 multiplies the vector (φαs0, φβs0, φαr0, φβr0)$^T$ by the matrix C2 and thereby outputs the estimated magnetic flux vector (φαr0, φβr0)$^T$. This corresponds to expression (27).

The gain matrix calculator 833 receives the estimated velocity ωr0 outputted from the velocity estimator 837, applies the matrix A to the vector (φαs0, φβs0, φαr0, φβr0)$^T$ outputted from the integrator 834, and outputs the result to the adder/subtractor 832.

The integrator 183 in FIG. 19, as in embodiment 1, integrates the estimated velocity ωr0 outputted from the status observer 182 by expression (5), thereby calculating the estimated position θ0.

The above is the description of the configuration, function, and operation of the adaptive observation section 18.

Next, the configuration, function, and operation of the magnetic flux vector detection section 19 will be described based on FIGS. 21 to 25.

First, the configuration of the magnetic flux vector detection section 19 will be described.

In FIG. 21 showing a configuration diagram of the magnetic flux vector detection section 19, the magnetic flux vector detection section 19 is composed of the filter 91, an α-axis component extractor 192, a β-axis component extractor 193, and a detected magnetic flux vector calculator 194.

As shown in FIG. 22, the α-axis component extractor 192 is composed of an α-axis component selector 961 and an amplitude calculator 962. As shown in FIG. 23, the β-axis component extractor 193 is composed of a β-axis component selector 963 and an amplitude calculator 964. As shown in FIG. 24, the detected magnetic flux vector calculator 194 is composed of a difference calculator 965, a cosine calculator 966, a sine calculator 967, and multipliers 968 and 969.

Next, the function and operation of the magnetic flux vector detection section 19 will be described. First, the entire operation of the magnetic flux vector detection section 19 will be described, and then the function and operation of each constituent element will be described.

A mathematical expression on α-β axes of the AC rotary machine 2 when the high-frequency voltage vector (vαh, vβh) is applied thereto by the high-frequency voltage vector generator 145 in FIG. 17 can be represented as expression (28). Here, p in the expression is a differential operator.

[Mathematical 28]

$$\begin{bmatrix} v\alpha h \\ v\beta h \end{bmatrix} = \begin{bmatrix} R + pL\alpha & 0 \\ 0 & R + pL\beta \end{bmatrix} \begin{bmatrix} i\alpha h \\ i\beta h \end{bmatrix} + \omega r \phi f \begin{bmatrix} -\sin\theta dm \\ \cos\theta dm \end{bmatrix} \quad (28)$$

Where $$\begin{pmatrix} L\alpha = L - l\cos2\theta dm, \ L\beta = L + l\cos2\theta dm \\ \theta dm: \text{Rotor position (position of rotor magnetic flux vector)} \\ i\alpha h: \alpha\text{-axis high-frequency current,} \\ i\beta h: \beta\text{-axis high-frequency current} \end{pmatrix}$$

As in embodiment 1, the high-frequency voltage vector is applied only in a region of zero speed to low speed. Therefore, if the rotational velocity is set at ωr≈0, expression (29) can be obtained.

[Mathematical 29]

$$\begin{bmatrix} v\alpha h \\ v\beta h \end{bmatrix} = R\begin{bmatrix} i\alpha h \\ i\beta h \end{bmatrix} + p\begin{bmatrix} L\alpha & 0 \\ 0 & L\beta \end{bmatrix}\begin{bmatrix} i\alpha h \\ i\beta h \end{bmatrix} \quad (29)$$

Further, the second term on the right-hand side is a differential of high-frequency current, and the differential of high-frequency current is multiplied by an angular frequency ωh of the high-frequency voltage. Therefore, the second term on the right-hand side >> the first term on the right-hand side is satisfied, so the first term on the right-hand side can be ignored. As a result, expression (30) can be obtained.

[Mathematical 30]

$$p\begin{bmatrix} i\alpha h \\ i\beta h \end{bmatrix} = \begin{bmatrix} L - l\cos2\theta dm & 0 \\ 0 & L + l\cos2\theta dm \end{bmatrix}\begin{bmatrix} v\alpha h \\ v\beta h \end{bmatrix} \quad (30)$$

Here, since the high-frequency voltage vector (vαh, vβh) is given by expression (22), the high-frequency current vector (iαh, iαh) is represented as expression (31) by substituting expression (22) into expression (30) and integrating both sides.

[Mathematical 31]

$$\begin{bmatrix} i\alpha h \\ i\beta h \end{bmatrix} = \frac{Vh}{\omega h}\begin{bmatrix} \frac{1}{L + l\cos2\theta dm} & 0 \\ 0 & \frac{1}{L - l\cos2\theta dm} \end{bmatrix}\begin{bmatrix} -\cos\omega ht \\ \sin\omega ht \end{bmatrix} \quad (31)$$

Next, the detected magnetic flux vector will be described. As shown in FIG. 25, at a given moment, the rotor magnetic flux vector Φr and α axis have a relationship shown in FIG. 25, and the angle therebetween is set at θdm. Since the rotor position is set in a direction parallel to the rotor magnetic flux vector, the rotor position as seen from a axis is θdm. As described above, in the present embodiment 3, since the deviation vector calculation section 6 calculates a magnetic flux deviation vector on α-β axes, the detected magnetic flux vector outputted from the magnetic flux vector detection section 19 is on α-β axes. In FIG. 25, of the rotor magnetic flux vector, a projected component in the α-axis direction is set at ϕαrD and a projected component in the β-axis direction is set at ϕβrD. Then, ϕαrD and ϕβrD are calculated by expression (32), and the detected magnetic flux vector (ϕαrD, ϕβrD) is outputted from the magnetic flux vector detection section 19.

[Mathematical 32]

$$\phi\alpha rD = |\phi r|\cos\theta dm \quad (32)$$
$$= \phi f\cos\theta dm$$
$$\phi\beta rD = |\phi r|\sin\theta dm$$
$$= \phi f\sin\theta dm$$

In expression (32), ϕf is the magnitude of the rotor magnetic flux vector Φr, and therefore is a known value. It is only necessary to know θdm, for calculating the components ϕαrD and ϕβrD of the detected magnetic flux vector from expression (32).

Looking at expression (31), since θdm is included in the magnitude of the high-frequency current vector (iαh, iβh), θdm can be calculated from the magnitude of the high-frequency current vector (iαh, iβh). When the magnitude of the high-frequency current iαh on a axis is set at |iαh| and the magnitude of the high-frequency current iβh on β axis is set at |iβh|, |iαh| and |iβh| are represented by expression (33).

[Mathematical 33]

$$|i\alpha h| = \frac{Vh}{\omega h} \frac{1}{L - l\cos 2\theta dm} \quad (33)$$
$$|i\beta h| = \frac{Vh}{\omega h} \frac{1}{L + l\cos 2\theta dm}$$

In addition, the magnitudes $|i\alpha h|$ and $|i\beta h|$ can be calculated by expression (34), using the high-frequency current vector $(i\alpha h, i\beta h)$. Here, T in expression (34) is the period of the high-frequency current vector $(i\alpha h, i\beta h)$.

[Mathematical 34]

$$|i\alpha h| = \sqrt{\frac{2}{T} \int_0^T i\alpha h^2 \, dt} \quad (34)$$
$$|i\beta h| = \sqrt{\frac{2}{T} \int_0^T i\beta h^2 \, dt}$$

From expression (33), a result of subtracting the reciprocal of $|i\alpha h|$ from the reciprocal of $|i\beta h|$ is represented by expression (35). From expression (35), θdm can be calculated as shown by expression (36).

[Mathematical 35]

$$\frac{1}{|i\beta h|} - \frac{1}{|i\alpha h|} = \frac{2\omega h l}{Vh} \cos 2\theta dm \quad (35)$$

[Mathematical 36]

$$\theta dm = \frac{\cos^{-1}\left\{\frac{Vh}{2\omega h l}\left(\frac{1}{|i\beta h|} - \frac{1}{|i\alpha h|}\right)\right\}}{2} \quad (36)$$

Thus, the detected magnetic flux vector (φαrD, φβrD) can be calculated by expressions (32) and (36).

The above is the entire operation of the magnetic flux vector detection section 19.

Next, the function and operation of each constituent element of the magnetic flux vector detection section 19 will be described.

The filter 91 in FIG. 21 is the same as in embodiment 1 except that its input and output are changed to a detected current vector and a high-frequency current vector on α-β axes. The filter 91 outputs the high-frequency current vector (iαh, iβh), based on the detected current vector (iαs, iβs).

As shown in FIG. 22, in the α-axis component extractor 192, the α-axis component selector 961 multiplies the high-frequency current vector (iαh, iβh) by a matrix $(1, 0)^T$, thereby selecting only iαh which is a component in the α-axis direction, of the high-frequency current vector. The amplitude calculator 962 performs calculation by expression (34), to calculate the magnitude $|i\alpha h|$ of iαh, and outputs the magnitude $|i\alpha h|$.

As shown in FIG. 23, in the β-axis component extractor 193, the β-axis component selector 963 multiplies the high-frequency current vector (iαh, iβh) by a matrix $(0, 1)^T$, thereby selecting only iβh which is a component in the β-axis direction, of the high-frequency current vector. The amplitude calculator 964 performs calculation by expression (34), to calculate the magnitude $|i\beta h|$ of iβh, and outputs the magnitude $|i\beta h|$.

The detected magnetic flux vector calculator 194 will be described. In FIG. 24, the difference calculator 965 performs calculation by expression (36) using $|i\alpha h|$ outputted from the α-axis component extractor 192 and $|i\beta h|$ outputted from the β-axis component extractor 193, and thereby outputs θdm. The cosine calculator 966 performs cosine calculation using θdm outputted from the difference calculator 965, and thereby outputs cos θdm. The multiplier 968 multiplies cos θdm outputted from the cosine calculator 966 by the magnitude φf of the rotor magnetic flux, and thereby outputs φαrD which is a detected magnetic flux vector component in the α-axis direction. The sine calculator 967 performs sine calculation using θdm outputted from the difference calculator 965, and thereby outputs sine dm. The multiplier 969 multiplies sin θdm outputted from the sine calculator 967 by the magnitude φf the rotor magnetic flux, and thereby outputs φβrD which is a detected magnetic flux vector component in the β-axis direction.

The above is the description of the configuration, function, and operation of the magnetic flux vector detection section 19.

As described above, the control device for AC rotary machine according to embodiment 3 calculates the magnetic flux deviation vector which is a deviation between the detected magnetic flux vector and the estimated magnetic flux vector, and the current deviation vector which is a deviation between the detected current vector and the estimated current vector, and uses the amplified deviation vector obtained by amplifying the magnetic flux deviation vector, thereby making it possible to drive an AC rotary machine by only one kind of estimated velocity or estimated position outputted from the adaptive observation section over a range from zero speed to high-speed region. Therefore, it is not necessary to cause both the low-frequency region phase generator and the high-frequency region phase generator to perform computing processing simultaneously, so the amount of computing processing can be greatly reduced.

In addition, in calculation of the detected magnetic flux vector (φdrD, φqrD) outputted from the magnetic flux vector detection section, a high-frequency current vector having the same frequency component as a high-frequency voltage vector is extracted from the detected current vector, θdm is calculated from the magnitude $|i\alpha h|$ of iαh which is a component in the α-axis direction of the extracted high-frequency current vector and the magnitude $|i\beta h|$ of iβh which is a component in the β-axis direction of the extracted high-frequency current vector, and then only θdm and the magnitude φf the rotor magnetic flux vector are used. Therefore, it is not necessary to prepare the rotor angle in advance, for calculating the detected magnetic flux vector, and therefore the computing amount can be reduced. In addition, since response of estimation of the rotor angle is not relevant to the calculation of the detected magnetic flux vector at all, response performance such as velocity control response or torque control response can be maintained at a high level.

Further, since the detected magnetic flux vector is a vector on α-β axes, the adaptive observation section can also be configured on α-β axes, so that each coordinate converter in the current vector detection section and the adaptive observation section can be changed from a coordinate converter for performing conversion to d-q axes, which requires the estimated position θ0, to a coordinate converter for performing conversion to α-β axes, which requires a less amount of computing, thus providing an effect of reducing the computing amount.

It is noted that, within the scope of the present invention, the above embodiments may be freely combined with each other, or each of the above embodiments may be modified or abbreviated as appropriate.

INDUSTRIAL APPLICABILITY

The present invention makes it possible to smoothly drive an AC rotary machine without using a position sensor over the entire velocity region, and realize reduction in the computing amount and improvement in response performance, and is applicable to a wide variety of control devices for AC rotary machine.

The invention claimed is:

1. A control device for an AC rotary machine, comprising:
a current vector detection section for detecting a detected current vector from current of the AC rotary machine;
a magnetic flux vector detection section for detecting a rotor magnetic flux vector from the detected current vector of the AC rotary machine and outputting the rotor magnetic flux vector as a detected magnetic flux vector;
an adaptive observation section for outputting an estimated current vector, an estimated magnetic flux vector, and an estimated position of the AC rotary machine obtained from an estimated angular velocity of the AC rotary machine:
a control section for outputting a voltage instruction vector so that the detected current vector coincides with a current instruction vector;
a voltage application section for applying voltage to the AC rotary machine, based on the voltage instruction vector;
a deviation vector calculation section for outputting a current deviation vector which is a deviation between the estimated current vector and the detected current vector, and a magnetic flux deviation vector which is a deviation between the estimated magnetic flux vector and the detected magnetic flux vector; and
a deviation amplification section for amplifying the current deviation vector and the magnetic flux deviation vector and outputting the amplified vectors as an amplified deviation vector,
wherein the adaptive observation section calculates the estimated current vector, the estimated magnetic flux vector, and the estimated angular velocity, based on the voltage instruction vector and the amplified deviation vector, and outputs the estimated current vector, the estimated magnetic flux vector, and the estimated position obtained from the estimated angular velocity, and
further, the control section outputs a voltage instruction vector on which a high-frequency voltage vector having a frequency component different from a frequency for driving the AC rotary machine is superimposed, and the magnetic flux vector detection section calculates and outputs the detected magnetic flux vector, based on a magnitude of a high-frequency current vector having the same frequency component as the high-frequency voltage vector, included in the detected current vector, and on a magnitude of a rotor magnetic flux.

2. The control device for an AC rotary machine according to claim 1, wherein the control section outputs a voltage vector on which an alternating-voltage high-frequency voltage vector is superimposed, and the magnetic flux vector detection section calculates and outputs the detected magnetic flux vector, based on, the high-frequency current vector, at least one of a magnitude of a component parallel to the alternating-voltage high-frequency voltage vector and a magnitude of a component orthogonal to the alternating-voltage high-frequency voltage vector, and on a magnitude of a rotor magnetic flux.

3. The control device for an AC rotary machine according to claim 2, wherein the detected magnetic flux vector outputted from the magnetic flux vector detection section is composed of a component parallel to the alternating-voltage vector and a component orthogonal to the alternating-voltage vector.

4. The control device for an AC rotary machine according to claim 1, wherein the control section outputs a voltage vector on which a rotational-voltage high-frequency voltage vector is superimposed, and the magnetic flux vector detection section resolves the high-frequency current vector into an orthogonal coordinate system at rest composed of $\alpha$ axis and $\beta$ axis, and calculates and outputs the detected magnetic flux vector, based on a magnitude of an $\alpha$-axis direction component and a magnitude of a $\beta$-axis direction component of the high-frequency current vector, and on a magnitude of the rotor magnetic flux.

5. The control device for an AC rotary machine according to claim 4, wherein the detected magnetic flux vector outputted from the magnetic flux vector detection section is composed of the $\alpha$-axis direction component and the $\beta$-axis direction component.

6. The control device for an AC rotary machine according to claim 1, wherein the deviation amplification section is configured to change an amplification gain for amplifying the current deviation vector and the magnetic flux deviation vector, in accordance with an estimated velocity of the AC rotary machine calculated by the adaptive observation section.

7. The control device for an AC rotary machine according to claim 1, wherein the AC rotary machine includes one of a synchronous machine or an induction machine.

8. A control device for an AC rotary machine, comprising:
a current vector detection section for detecting a detected current vector from a current of the AC rotary machine;
a magnetic flux vector detection section for detecting a rotor magnetic flux vector from the detected current vector of the AC rotary machine and outputting the rotor magnetic flux vector as a detected magnetic flux vector;
an adaptive observation section for outputting an estimated current vector, an estimated magnetic flux vector, and an estimated position of the AC rotary machine;
a control section for outputting a voltage instruction vector so that the detected current vector coincides with a current instruction vector;
a voltage applier that applies voltage to the AC rotary machine, based on the voltage instruction vector;
a deviation vector calculation section for outputting a current deviation vector which is a deviation between the estimated current vector and the detected current vector, and a magnetic flux deviation vector which is a deviation between the estimated magnetic flux vector and the detected magnetic flux vector; and
a deviation amplification section for amplifying the current deviation vector and the magnetic flux deviation vector and outputs the amplified vectors as an amplified deviation vector, wherein
the adaptive observation section calculates and outputs the estimated current vector, the estimated magnetic flux vector, and the estimated position, based on the voltage instruction vector and the amplified deviation vector, and further, the control section outputs a voltage instruction on which a high-frequency voltage vector having a frequency component different from a frequency for driving the AC rotary machine is superimposed, and the magnetic flux vector detection section calculates an angular difference between an axis that is parallel to the estimated magnetic flux vector and an axis that is parallel to the rotor magnetic flux vector based on a magnitude of a high-frequency current vector having the same frequency component as the high-frequency voltage vector, included in the detected current vector, and calculates and outputs the detected magnetic flux vector, based on the angular difference and a magnitude of a rotor magnetic flux.

9. The control device for an AC rotary machine according to claim 8, wherein
the control section outputs a voltage vector on which an alternating-voltage high-frequency voltage vector is superimposed, and
the magnetic flux vector detection section calculates the angular difference between the axis that is parallel to the estimated magnetic flux vector and the axis that is parallel to the rotor magnetic flux vector based on the high-frequency current vector, at least one of a magnitude of a component parallel to the high-frequency voltage vector and a magnitude of a component orthogonal to the high-frequency voltage vector, and calculates and outputs the detected magnetic flux vector based on the angular difference and a magnitude of a rotor magnetic flux.

10. The control device for an AC rotary machine according to claim 9, wherein
the detected magnetic flux vector outputted from the magnetic flux vector detection section includes a component parallel to the high-frequency voltage vector and a component orthogonal to the high-frequency voltage vector.

11. The control device for an AC rotary machine according to claim 8, wherein
the control section outputs a voltage vector on which a rotational-voltage high-frequency voltage vector is superimposed, and
the magnetic flux vector detection section resolves the high-frequency current vector into an orthogonal coordinate system at rest composed of an $\alpha$ axis and a $\beta$ axis, calculates the angular difference between the axis that is parallel to the estimated magnetic flux vector and the axis that is parallel to the rotor magnetic flux vector based on a magnitude of an $\alpha$-axis direction component and a magnitude of a $\beta$-axis direction component of the high-frequency current vector, and calculates and outputs the detected magnetic flux vector, based on the angular difference and a magnitude of the rotor magnetic flux.

12. The control device for an AC rotary machine according to claim 8, wherein
the magnetic flux vector detection section calculates the angular difference between the axis that is parallel to the estimated magnetic flux vector and the axis that is parallel to the rotor magnetic flux vector based on a magnitude of a high-frequency current vector having the same frequency component as the high-frequency voltage vector, included in the detected current vector, and an angular frequency having the same frequency component as the high frequency voltage vector, and calculates and outputs the detected magnetic flux vector, based on the angular difference and a magnitude of a rotor magnetic flux.

13. The control device for an AC rotary machine according to claim 8, wherein
the magnetic flux vector detection section calculates the angular difference between the axis that is parallel to the estimated magnetic flux vector and the axis that is parallel to the rotor magnetic flux vector based on a magnitude of a high-frequency current vector having the same frequency component as the high frequency voltage vector, included in the detected current vector, an angular frequency having the same frequency component as the high-frequency voltage vector, and a high-frequency voltage amplitude having the same frequency component as the high-frequency voltage vector, and calculates and outputs the detected magnetic flux vector, based on the angular difference and a magnitude of a rotor magnetic flux.

\* \* \* \* \*